(12) United States Patent
Mushika et al.

(10) Patent No.: US 7,109,672 B1
(45) Date of Patent: Sep. 19, 2006

(54) BRUSHLESS MOTOR CONTROL DEVICE AND DISC APPARATUS USING THE SAME

(75) Inventors: Yoshihiro Mushika, Neyagawa (JP); Tooru Kawabata, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 665 days.

(21) Appl. No.: 10/130,577

(22) PCT Filed: Nov. 8, 2000

(86) PCT No.: PCT/JP00/07859

§ 371 (c)(1),
(2), (4) Date: Aug. 8, 2002

(87) PCT Pub. No.: WO01/39358

PCT Pub. Date: May 31, 2001

(30) Foreign Application Priority Data

Nov. 19, 1999 (JP) .................................. 11-329490
Apr. 24, 2000 (JP) .............................. 2000-122682

(51) Int. Cl.
- H02K 21/00 (2006.01)
- H02K 23/00 (2006.01)
- H02K 31/00 (2006.01)
- H02P 1/18 (2006.01)
- H02P 3/08 (2006.01)

(52) U.S. Cl. ....................... 318/254; 318/139; 318/439; 318/560

(58) Field of Classification Search ................. 318/254, 318/138, 439, 560
See application file for complete search history.

(56) References Cited

U.S. PATENT DOCUMENTS

| | | | | |
|---|---|---|---|---|
| 5,636,193 A | * | 6/1997 | Ohmi | 369/53.42 |
| 5,923,134 A | * | 7/1999 | Takekawa | 318/254 |
| 5,982,133 A | * | 11/1999 | Murakami et al. | 318/650 |
| 6,081,087 A | * | 6/2000 | Iijima et al. | 318/439 |
| 6,121,736 A | * | 9/2000 | Narazaki et al. | 318/254 |
| 6,411,057 B1 | * | 6/2002 | Gotou | 318/599 |
| 6,462,491 B1 | * | 10/2002 | Iijima et al. | 318/254 |

FOREIGN PATENT DOCUMENTS

| | | |
|---|---|---|
| JP | 6-276786 | 9/1994 |
| JP | 10-127086 | 5/1998 |
| JP | 2002-60114 | 2/2002 |

* cited by examiner

*Primary Examiner*—Rina Duda
*Assistant Examiner*—Erick Glass
(74) *Attorney, Agent, or Firm*—Snell & Wilmer LLP

(57) ABSTRACT

A brushless motor control device includes a brushless motor including a rotor magnet and a stator coil; rotor position detection means for detecting positions of a plurality of magnetic poles of the rotor magnet; vibration detection means for detecting an unnecessary vibration of the brushless motor when the brushless motor is rotating; lead angle setting means for setting a magnitude of a lead angle such that a first output from the vibration detection means does not exceed a prescribed tolerable value; and lead angle correction means for providing the lead angle to a third output, from the rotor position detection means, in accordance with a second output from the lead angle setting means, so as to generate a translocation timing of a driving current to the stator coil.

12 Claims, 12 Drawing Sheets

BRUSHLESS MOTOR CONTROL DEVICE AND DISC APPARATUS USING THE SAME

TECHNICAL FIELD

The present invention relates to a brushless motor control device and a disc apparatus using the same, and in particular to a brushless motor control device for setting a lead angle to change the motor's characteristics, and a disc apparatus using the same.

BACKGROUND ART

Conventionally, a plurality of types of information discs of different recording formats are handled by one type of disc apparatus for recording information thereto and reproducing information therefrom. In the case of optical discs, for example, a disc apparatus for handling discs such as DVD-ROM discs, DVD-RAM discs, and CD-ROM discs has been put into practice.

This type of disc apparatus is often designed to provide each of elements such as a head, a disc motor, a signal processing LSI and the like with all the functions required for recording and reproduction of various types of discs. Therefore, a condition which is set for one type of disc may disturb a condition for another type of disc, which prevents improvements in performance.

For example, when designing a disc motor, the motor's characteristics are often determined in accordance with the rotation conditions of the disc which is to be rotated at the highest rate among all the types of discs used with the disc motor. In this case, in order to reduce the inverse electromotive force of the motor, the number of turns of the coil, for example, is decreased so as to reduce the number of linkage magnetic fluxes between the rotor magnet and the stator coil, thus reducing the generated torque per unit current (torque constant). As a result, inconveniences occur such that, for example, the generation torque of the motor is reduced, and the time required to change the rotation rate of the motor to the target rotation rate is extended.

For example, in the case of a disc apparatus handling discs such as DVD-ROM discs, DVD-RAM discs and CD-ROM discs, the rotation rate required of a spindle motor for recording information to and reproducing information from a DVD-RAM disc is about 3250 rpm at the maximum. In order to increase the speed of a seek operation for the purpose of performing ZCLV (Zoned Constant Linear Velocity) control, a high torque is required for speeds in the range of 1350 rpm (which is a relatively low rate) to 3250 rpm. For recording information to or reproducing information from CD-ROM discs and DVD-ROM discs, there is a strong demand for high speed reproduction. Information on CD-ROMs is often required to be reproduced at a speed of x40 or higher. In order to realize this, a maximum rotation rate of about 9000 rpm is required. Since such a high rotation rate is required only for reproduction, it is not necessary to change the rotation rate during a seek operation owing to a circuit having, for example, a jitter-free structure. Therefore, a very high torque is not needed for a seek operation.

As described above, when the motor coil is designed to provide a high rotation rate and a low torque so as to realize a high reproduction speed which is demanded for CD-ROM discs and DVD-ROM discs, the high torque required for the high speed seek operation for the DVD-RAM discs is not obtained. By contrast, when the motor coil is designed with a larger number of turns to provide a low rotation rate and a high torque for DVD-RAM discs, the rotation rate required for the high speed reproduction for the CD-ROM discs and DVD-ROM discs is not obtained. In this case, these two requirements cannot be provided by one motor.

Japanese Laid-Open Publication No. 10-127086 discloses a technology for making the torque constant of a motor variable by offsetting the translocation timing, for the electric current flowing to the stator coil of the motor, from the regular timing. This technology will be described with reference to FIG. 9.

FIG. 9 shows a structure of a conventional control device 400 for a brushless motor. The control device 400 includes an AC power supply 111, a rectifying and smoothing circuit 112, a switching power supply 113 for outputting a DC voltage VM, a driving control circuit 114 for receiving the DC voltage VM, a pulse width modulation circuit 115, rotor position detectors 108U, 108V and 108W, and a DC motor 123.

The driving control circuit 114 includes a differential amplifier 116 for removing a noise component from three-phase output signals HU', HV' and HW' from the rotor position detectors 108U, 108V and 108W, comparators 117U, 117V and 117W for comparing the three-phase output signals HU', HV' and HW', amplifiers 120U, 120V and 120W for amplifying one of two output signals of the three-phase output signals HU', HV' and HW' which are respectively input to the comparators 117U, 117V and 117W, a logic circuit 118, a current switching circuit 119, a frequency/voltage converter (F/V converter) 121, and amplification ratio varying devices 122U, 122V and 122W.

Here, the amplification ratio of each of the amplifiers 120U, 120V and 120W is K. The comparator 117U compares a multiplication signal HU1 obtained by multiplying the U-phase output signal HU' from the differential amplifier 116 by amplification ratio K, with the V-phase output signal HV', and outputs a comparison signal HU2. The comparator 117V compares a multiplication signal HV1 obtained by multiplying the V-phase output signal HV' from the differential amplifier 116 by amplification ratio K, with the W-phase output signal HW', and outputs a comparison signal HV2. The comparator 117W compares a multiplication signal HW1 obtained by multiplying the W-phase output signal HW' from the differential amplifier 116 by amplification ratio K, with the U-phase output signal HU', and outputs a comparison signal HW2.

The comparison signals HU2, HV2 and HW2 are input to the logical circuit 118. The logical circuit 118 outputs U-, V- and W-phase positive (N-pole) output signals HUU, HVU and HWU to the current switching circuit 119. Simultaneously, the logical circuit 118 outputs U-, V- and W-phase negative (S-pole) output signals HUL, HVL and HWL to the current switching circuit 119.

The current switching circuit 119 turns ON switching power elements TRU1, TRV1, and TRW1 through the U-, V- and W-phase positive poles, and turns ON switching power elements TRU2, TRV2, and TRW2 through the U-, V- and W-phase negative poles. Thus, the current switching circuit 119 sequentially provides a DC voltage VM to the 3-phases 107U, 107V and 107W of the DC motor 123.

The F/V converter 121 converts the output from the differential amplifier 116 into a voltage signal. The amplification ratio varying devices 122U, 122V and 122W vary the amplification ratio K of the amplifiers 120U, 120V and 120W in accordance with the output from the F/V converter 121.

Owing to the above-described structure, when one of the two signals input to each of the comparators 117U, 117V and 117W is respectively amplified by the amplifiers 120U, 120V and 120W at the amplification K where K>1, a lead angle Δθ is given to the three phases 107U, 107V and 107W of the DC motor 123. The lead angle Δθ is set to an optimum value in accordance with the rotation rate of a rotator assembly by the function of the F/V converter 121.

The above-described control device 400 for a brushless motor has the following problems.

When a large lead angle is given to the brushless motor (for example, the DC motor 123), the torque ripple of the brushless motor is increased, and thus an unnecessary vibration of the control device 400 is increased. This makes it difficult to apply the control device 400 to a precision device which is vulnerable to vibrations. The magnitude of vibration is determined by a composite of factors including variance in a vibration adding force occurring due to individual variances among brushless motors and variance in vibration transfer characteristics of the entirety of the control device 400 which is associated with the variance in vibration adding force. In order to restrict the magnitude of the unnecessary vibration to a prescribed value or less with an allowance for all the variance factors, it is necessary that the adjustable range of the lead angle be restricted to be narrow. Thus, the motor's characteristics cannot be significantly changed. When a large lead angle is given to the brushless motor, there occurs another problem that the reliability of the control device 400 for restricting the vibration level to a prescribed level or less is not sufficient.

The level at which the disc apparatus using a brushless motor is allowed to vibrate varies depending on whether an information disc having a high recording density such as a DVD disc is used or an information disc having a low recording density such as a CD-ROM disc is used. As a result, the range of lead angle which can be set for the brushless motor varies. The level at which the disc apparatus using a brushless motor is allowed to vibrate also varies depending on whether a reproduction-only DVD-ROM disc is used or a recordable and reproduceable DVD-RAM disc is used. The range of lead angle which can be set for the brushless motor varies. Such a change in the allowed level of vibration was not conventionally considered.

The above-described disc apparatus complicates the control of variable lead angles, which makes it difficult to simplify the motor control structure. The reason is that the lead angle is set in accordance with the rotation rate. Such a system requires elements including the F/V converter and also requires that the rotation rate be monitored constantly so as to update the lead angle. As a result, a circuit dedicated to setting the lead angle is required, or use of interrupts is often required in order to update the lead angle in the case where a CPU, a DSP or the like is used.

In the case where the target rotation rate is frequently changed and it is necessary to control the actual rotation rate to follow the target rotation rate, the driving current amplitude needs to be controlled while changing the lead angle. Since two parameters are changed simultaneously, the control operation is complicated.

The setting precision of the lead angle is deteriorated due to the variance in the amplitude among the outputs from the three rotor position detectors 108U, 108V and 108W and also due to the waveform distortion of the outputs. When the outputs from the rotor position detectors 108U, 108V and 108W have ideal sine wave signals having equal amplitudes to each other, an accurate lead angle can be set for the following reason. By amplifying one of the two outputs by a constant value and synthesizing the amplified output with the other output, a sine wave signal having a phase which is shifted by a desired amount can be formed. In actuality, however, the outputs from the three rotor position detectors 108U, 108V and 108W have different amplitudes due to, for example, the individual variance among rotor position detectors (for example, hall elements) or changes in characteristics of the rotor position detectors which occur due to temperature. When such signals having different amplitudes are used, the lead angle is different among the U-, V-, and W-phases. This generates an error in the lead angle among the phases. In addition, the outputs from the rotor position detectors 108U, 108V and 108W themselves do not have pure sine waveforms. Due to, for example, the variance in magnetization characteristics of the rotor magnet, the waveforms of the outputs may sometimes be distorted with a high harmonic component superimposed on the output being large. In such a state, the relationship between the amplification ratio K and the lead angle significantly changes from the relationship when a pure sine wave signal is obtained. This deteriorates the setting precision of the lead angle.

It is not necessary that the lead angle can be arbitrary controlled. It is possible to preset the lead angle as one factor with respect to the rotation rate of the motor. This factor generally increases in accordance with the increase in the rotation rate of the motor (∝hall output frequency) in a simple manner. Such a factor is very easily realized by, for example, using a differentiation circuit. Japanese Laid-Open Utility Model Publication No. 62-48198 discloses a technology for setting a lead angle in accordance with the rotation rate of the two-phase pulse motor using the differentiation circuit. Such a technology will be described with reference to FIG. 10.

FIG. 10 shows a structure of a conventional pulse motor driving circuit 500. The pulse motor driving circuit 500 includes a two-phase exciting pulse motor 131, a high resolution encoder 132 connected to the pulse motor 131 for generating an output signal Sf in accordance with a rotation angle θ of the pulse motor 131, an angle calculation circuit 133 for calculating a rotation angle θm of the pulse motor 131 with respect to the magnetic pole based on the output Sf of the encoder 132, a factor generation circuit 134 for generating sine wave signals Ss and Sc having a phase difference of 90 degrees with each other in accordance with the rotation angle θm, multipliers 135 and 136 for varying the amplitudes of the sine wave signals Ss and Sc in accordance with the amplitude of a control signal Si, phase leading circuits 139 and 140, and power amplifiers 137 and 138. Outputs IA and IB of the power amplifiers 137 and 138 are respectively provided to armature coils (not shown) of the pulse motor 131.

FIG. 11 shows an exemplary structure of the phase leading circuits 139 and 140. The phase leading circuits 139 and 140 shown in FIG. 11 each include an amplifier 141, resistors 142 and 143, and a capacitor 144. A phase leading amount of the phase leading circuits 139 and 140 is selected so as to compensate for a phase delay of the magnetic flux with respect to the frequency change in the exciting current.

The position of the rotor (not shown) in the pulse motor 131 is detected by the encoder 132 and the angle calculation circuit 133. The exciting currents IA and IB corresponding to the position are respectively provided to the armature coils.

The amplitudes of the outputs Ss and Sc from the factor generation circuit 134 are represented by expression (1).

$$Ss = \sin(\theta m + \pi/2)$$

$$Sc = \cos(\theta m + \pi/2) \qquad (1).$$

Where the amplitude of the control signal Si is Io, the magnitudes of the exciting currents IA and IB supplied to the armature coils of the pulse motor 131 are represented by expression (2).

$$IA = Io^* \sin(\theta m + \pi/2)$$

$$IB = Io^* \cos(\theta m + \pi/2) \qquad (2).$$

As is clear from expression (2), the exciting currents IA and IB supplied to the respective armature coils have a phase difference of 90 degrees, and the sum thereof (vector synthesis) is constant. Therefore, the rotor generates a constant torque without non-uniformity. The magnitude of the torque is in proportion to the amplitude Io of the control signal Si. Therefore, when the load is zero, the pulse motor 131 is paused if Io is zero. When Io increases, the pulse motor 131 rotates at the rate in accordance with Io.

The electric angle in the synthesis current of the exciting currents IA and IB always has a phase difference of 90 degrees with respect the mechanical angle (rotation angle θ) of the rotator of the pulse motor 131. Therefore, the maximum torque can be generated.

However, when the pulse motor 131 goes into a high rate operation area and thus the frequency of the exciting currents IA and IB increases, the phase of the magnetic flux generated with respect to the driving current is delayed due to the iron loss in the magnetic path or the like. As a result, the maximum torque cannot be generated.

In order to avoid this, the phase leading circuits 139 and 140 are provided in the exciting circuit. When the pulse motor 131 goes into the high rate operation area and thus the frequency of the exciting currents IA and IB increases, the phases of the exciting currents IA and IB are led by the phase leading circuits 139 and 140. Accordingly, the phase delay of the magnetic flux caused by the iron loss in the magnetic path can be compensated for by the leading phase of the exciting currents IA and IB. Thus, it is possible to maintain the phase difference between the mechanical angle and the magnetic flux of the rotor so as to prevent a reduction in the generated torque.

The pulse motor driving circuit 500 has the following problems.

It is assumed that the pulse motor driving circuit 500 is applied to a disc apparatus, and the translocation timing for the electric current flowing to the stator coil of the motor is offset from the regular timing so as to make the torque constant of the motor variable. When it is attempted to realize a high maximum rotation rate required for the high speed reproduction of the CD-ROM discs and the DVD-ROM discs in this state, the phase is excessively led even when the DVD-RAM discs are rotated at a low rate for a high speed seek operation, resulting in a reduction in the torque.

This will be described in detail with reference to FIG. 12. FIG. 12 shows the relationship between the rotation rate and the phase lead angle which is obtained by the phase leading circuit. Characteristic 28 shown in FIG. 12 shows the relationship between the rotation rate and the phase lead angle when the constant of the phase lead circuit is set so as to be appropriate to the high speed reproduction of the CD-ROM discs. Characteristic 28 is obtained when, for example, value R1 of the resistor 143 is set to a relatively small value, the value of the capacitor 144 is set to 0.01 μF, and value R2 of the resistor 142 is set to 21 kΩ in the phase leading circuits 139 and 140.

This setting has main purposes of making the lead angle larger than the lead angle which is necessary to compensate for the current delay caused by the inductance component of the coil, reducing the torque constant of the motor by the effect of the weak field, and restricting generation of an inverse electromotive force so as to improve the maximum rotation rate of the motor. In this manner, the rotation rate of 9000 rpm which is required for x42 reproduction of a CD-ROM disc can be obtained using a disc motor having a no-load rotation rate of 6300 rpm, a starting torque of 190 gcm and a torque constant of 0.17 gcm/mA.

However, characteristic 28 results in a phase lead angle as large as about 10 to 23 degrees with respect to the rotation range of the DVD-RAM discs of 1370 to 3250 rpm. Since the torque constant is reduced by the effect of the weak field, the seek time is undesirably delayed in a DVD-RAM disc which requires the rotation rate to be changed during the seek operation for performing the ZCLV control.

Characteristic 27 shown in FIG. 12 shows the relationship between the rotation rate and the phase lead angle which is appropriate for recording information to or reproducing information from DVD-RAM discs. Characteristic 27 is obtained when R2 is set to a relatively small value, the value of the capacitor 144 is set to 0.01 μF and R1 is set to 6 kΩ. This setting has main purposes of making the lead angle larger so as to be sufficient to compensate for the current delay caused by the inductance component of the coil and maximizing the torque constant of the motor.

Thus, the time of the seek operation of a DVD-RAM disc performed by the same disc motor can be shortened. However, characteristic 27 results in a maximum rotation rate as low as about 5700 rpm, which is not sufficient for the high speed reproduction of information on CD-ROM discs.

As described above, the conditions for the high speed reproduction and the conditions for reduction in the seek time conflict with each other with a single circuit constant setting. It is ideal to realize, for example, characteristic 29 shown in FIG. 12 by which the lead angle rapidly increases when the rotation rate of the motor reaches a prescribed level. However, it is difficult to realize characteristic 29 with the phase leading circuits 139 and 140 shown in FIG. 11.

The present invention for solving the above-described problems has an objective of providing a control device for a brushless motor which is highly reliable against vibrations, is capable of performing easy motor control, and provides a high setting precision of a lead angle; and a disc apparatus using the same.

The present invention also has an objective of providing a disc apparatus for realizing, with one motor and a simple structure, both a high speed seek operation for ZCLV control when recording information to or reproducing information from a DVD-RAM disc and a high speed reproduction operation of a CD-ROM disc and a DVD-ROM disc.

DISCLOSURE OF THE INVENTION

A brushless motor control device according to the present invention includes a brushless motor including a rotor magnet and a stator coil; rotor position detection means for detecting positions of a plurality of magnetic poles of the rotor magnet; vibration detection means for detecting an unnecessary vibration of the brushless motor when the brushless motor is rotating; lead angle setting means for setting a magnitude of a lead angle such that a first output from the vibration detection means does not exceed a prescribed tolerable value; and lead angle correction means for providing the lead angle to a third output, from the rotor position detection means, in accordance with a second output from the lead angle setting means, so as to generate a translocation timing of a driving current to the stator coil.

A disc apparatus according to the present invention includes the above-described brushless motor control device. The brushless motor rotates an information disc. The disc apparatus includes a head for recording information to the information disc or reproducing information from the information disc; and head control means for controlling the head to be on a track of the information disc. The vibration detection means detects a magnitude of the unnecessary vibration from a control residual between the head and the track.

A disc apparatus according to the present invention for allowing a plurality of types of information discs of different recording formats to be exchangeably mounted thereon includes a brushless motor including a rotor magnet and a stator coil for rotating at least one information disc mounted on the disc apparatus among the plurality of types of information discs; rotor position detection means for detecting positions of a plurality of magnetic poles of the rotor magnet; distinguishing means for distinguishing a recording format of the at least one information disc: lead angle setting means for setting a magnitude of a lead angle utilizing a first output from the distinguishing means; and lead angle correction means for providing the lead angle to a third output, from the rotor position detection means, in accordance with a second output from the lead angle setting means, so as to generate a translocation timing of a driving current to the stator coil.

A disc apparatus according to the present invention may further include vibration detection means for detecting an unnecessary vibration of the brushless motor when the brushless motor is rotating. The lead angle setting means may set a magnitude of a tolerable value of the unnecessary vibration in accordance with the first output and sets the magnitude of the lead angle such that a fourth output from the vibration detection means does not exceed the tolerable value.

At least a first information disc and a second information disc having a lower recording density than that of the first information disc among the plurality of types of information discs may be exchangeably mounted. When the distinguishing means detects the presence of the first information disc, the lead angle setting means may set the lead angle to be smaller than when the distinguishing means detects the presence of the second information disc.

The at least one information disc may be driven with ZCLV control, and the lead angle may be set to substantially 0 degrees.

The at least one information disc may be driven with CAV control.

At least a recording and reproduction information disc usable for recording and reproduction and a reproduction-only information disc usable only for reproduction among the plurality of types of information discs may be exchangeably mounted. When the distinguishing means detects the presence of the recording and reproduction information disc, the lead angle setting means may set the lead angle to be smaller than when the distinguishing means detects the presence of the reproduction-only information disc.

A brushless motor control device according to the present invention includes a brushless motor including a rotor magnet and a stator coil; rotor position detection means for detecting positions of a plurality of magnetic poles of the rotor magnet; and lead angle correction means for providing a lead angle having a variable amount to an output from the rotor position detection means, so as to generate a translocation timing of a driving current to the stator coil. The rotor position detection means generates a plurality of detection signals having different phases from each other. The lead angle correction means includes regulation means for converting the plurality of detection signals into a plurality of generally sine-waved signals having a prescribed amplitude, and synthesis means for synthesizing the plurality of generally sine-waved signals at a prescribed ratio.

The regulation means may include a low pass filter for allowing a signal in a frequency range corresponding to the rotation frequency of the brushless motor, among the plurality of detection signals, to pass therethrough.

The regulation means may include an AGC circuit.

A disc apparatus according to the present invention includes the above-described brushless motor control device. The brushless motor rotates an information disc. The disc apparatus includes a head for recording information to the information disc or reproducing information from the information disc; and head control means for controlling the head to be on a track of the information disc.

A disc apparatus according to the present invention for allowing a plurality of types of information discs of different recording formats to be exchangeably mounted thereon includes a brushless motor including a rotor magnet and a stator coil for rotating at least one information disc among the plurality of types of information discs; rotor position detection means for detecting positions of a plurality of magnetic poles of the rotor magnet; lead angle correction means for providing a lead angle having a variable amount to a first output from the rotor position detection means, so as to generate a translocation timing of a driving current to the stator coil; and distinguishing means for distinguishing the recording format of the at least one information disc mounted on the disc apparatus. The lead angle correction means includes a plurality of differentiation circuits, and a circuit constant of each of the plurality of differentiation circuits is changed utilizing a second output from the distinguishing means, and thus a relationship between a rotation rate and the lead angle of the brushless motor is changed.

The plurality of differentiation circuits each may include a plurality of resistors; a capacitor; and at least one transistor connected parallel to at least one of the plurality of resistors. The circuit constant may be changed by switching an ON state and an OFF state of the at least one transistor.

A disc apparatus according to the present invention for allowing a plurality of types of information discs of different recording formats to be exchangeably mounted thereon includes a brushless motor including a rotor magnet and a stator coil for rotating at least one information disc among the plurality of types of information discs; rotor position detection means for detecting positions of a plurality of magnetic poles of the rotor magnet; lead angle correction means for providing a lead angle having a variable amount to a first output from the rotor position detection means, so as to generate a translocation timing of a driving current to the stator coil; and distinguishing means for distinguishing the recording format of the at least one information disc mounted on the disc apparatus. The lead angle correction means includes a plurality of integration circuits, and a circuit constant of each of the plurality of integration circuits is changed utilizing a second output from the distinguishing means, and thus a relationship between a rotation rate and the lead angle of the brushless motor is changed.

The plurality of integration circuits each may include a plurality of resistors; a capacitor; and at least one transistor connected parallel to at least one of the plurality of resistors.

The circuit constant may be changed by switching an ON state and an OFF state of the at least one transistor.

The lead angle correction means may further include a plurality of inverters, and a third output, obtained by inverting the first output by one of the plurality of inverters, is input to at least one of the plurality of resistors.

The lead angle correction means may further include a plurality of amplifiers. The first output may include a first signal and a second signal which are offset by a prescribed angle with respect to each other. The first signal may be input to a first amplifier among the plurality of amplifiers. The second signal may be input to at least one of the plurality of resistors of a first integration circuit, among the plurality of integration circuits, corresponding to the first amplifier.

The first output may be provided in advance with a prescribed lead angle.

The stator coil may include N phases which are driven by driving currents which are offset by a prescribed angle with respect to each other. The first output may include N signals which are offset by the prescribed angle with respect to each other. The lead angle correction means may generate a translocation timing of the driving currents to the stator coil using n signals among the N signals. N is an integer equal to or greater than two, and n is an integer equal to or greater than two but equal to or smaller than N.

BEST MODE FOR CARRYING OUT THE INVENTION

Hereinafter, examples of the present invention will be described with reference to the figures.

EXAMPLE 1

Figure 1:
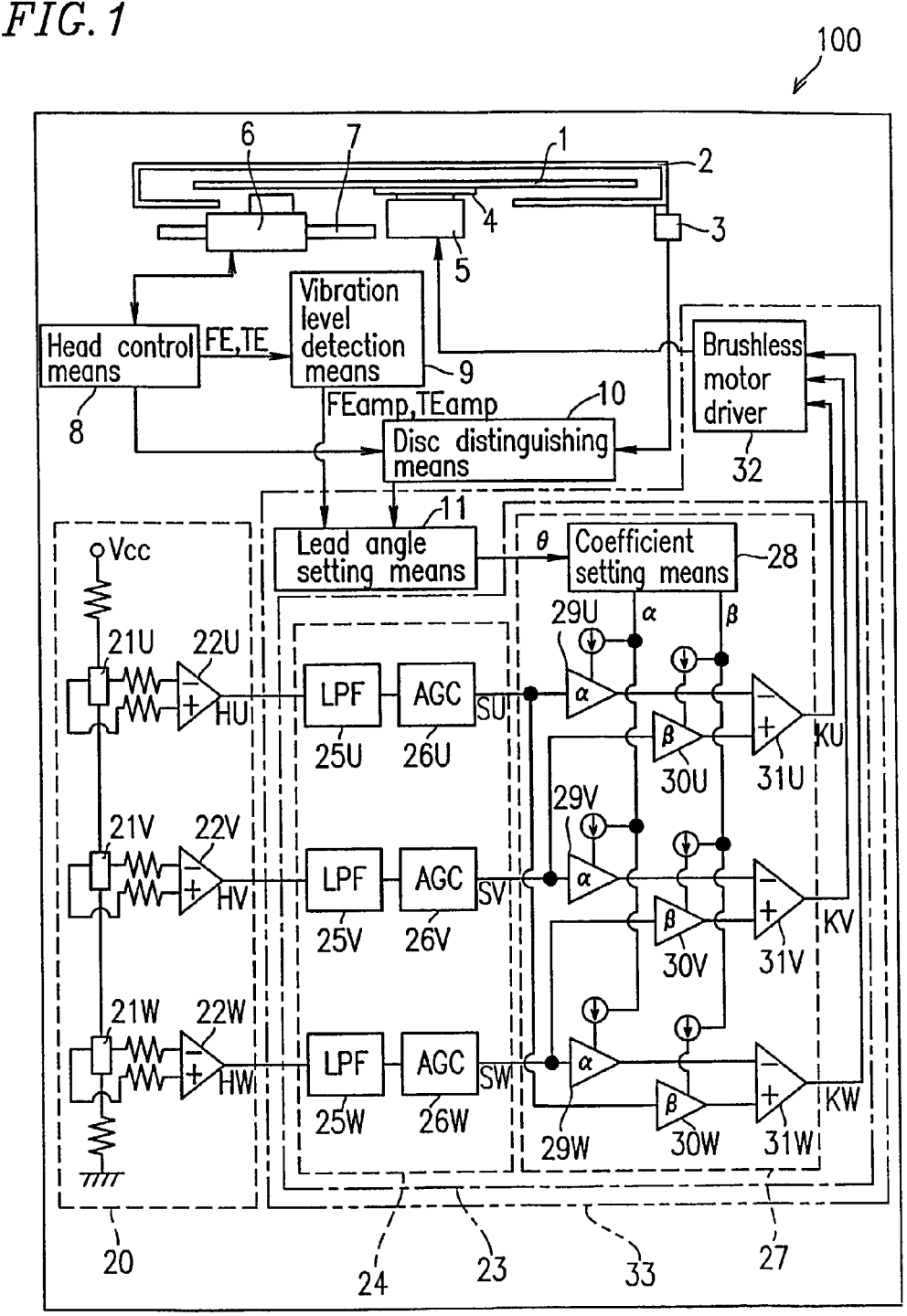
FIG. 1 shows an optical disc apparatus according to a first example of the present invention.

FIG. 1 is a schematic structural view of a disc apparatus 100 according to a first example of the present invention. The disc apparatus 100 allows a plurality of types of optical discs 1 of different recording formats to be mounted thereon exchangeably and detachably by a loading mechanism (not shown). Examples of the optical discs 1 include DVD-ROM discs and DVD-RAMs having a higher recording density (having a recording capacity of, for example, 2.6 GB or 4.7 GB and having a thickness of 0.6 mm), and CD-ROM discs having a lower recording density (having a recording capacity of, for example, 650 MB and a thickness of 1.2 mm; including CD-R discs). The DVD-ROM discs and CD-ROM discs may be in the form of not being accommodated in a cartridge 2, and the DVD-RAM discs may be in the form of being accommodated in the cartridge 2. Regardless of the recording format, the optical discs 1 are common in having a recording track, and in having information recorded along the recording track or allowing information to be recorded along the recording track.

The disc apparatus 100 includes cartridge detection means 3, a turntable 4, a brushless motor 5, an optical head 6, a guide shaft 7, head control means 8, vibration level detection means 9, disc distinguishing means 10, rotor position detection means 20, and brushless motor control means 33. The brushless motor 5 is used as a disc motor. The brushless motor control means 33 includes and controls lead angle setting means 11, a brushless motor driver 32, and lead angle correction means 23. The lead angle correction means 23 includes regulation means 24 and synthesis means 27. The synthesis means 27 includes coefficient setting means 28.

The cartridge detection means 3 includes a microswitch (not shown) provided at a position of the disc apparatus 100 which contacts the cartridge 2 for a DVD-RAM disc. The cartridge detection means 3 thus detects whether the DVD-RAM disc is accommodated in the cartridge 2 or not. The turntable 4 has the optical disc 1 mounted thereon inserted into the disc apparatus 100 by the loading mechanism, and the brushless motor 5 rotates the turntable 4. The brushless motor 5 is, for example, an outer rotor-type three-phase DC brushless motor. Although not shown, the brushless motor 5 may include a 12-pole magnetization rotor magnet and 9-pole three-phase stator coil, and may be driven by a brushless motor driver 32 at a power supply of 5 V or 12 V. The exemplary structure described below is driven at a power supply of 5 V. The brushless motor 5 includes a coil and the like designed so as to have torque characteristics which are sufficient to realize a maximum rated rotation rate of the DVD-RAM disc of 3250 rpm when the lead angle is 0 degrees, as described below. When the lead angle is 0 degrees, the maximum rotation rate of the brushless motor 5 with no load may be about 6500 rpm. The optical head 6 is supported so as to be movable in a radial direction of the disc along the guide shaft 7 by a head transfer motor (not shown), so as to record information on the optical disc 1 or reproduce information from the optical disc 1.

The head control means 8 performs processing, such as, for example, demodulation or error correction, on the information read from the optical disc 1 by the optical head 6, so as to convert the information into an effective data stream, and also controls a light beam from the optical head 6 to be on a desired recording track of the optical disc 1. In order to control the light beam to be on the recording track, two types of control are performed. One is focusing control to cause a focal point of the light beam to be on a recording surface including the recording track. The other is tracking control for causing the light beam to follow the recording track. The control residual after these types of control is output to the vibration level detection means 9 as a focusing error signal FE and a tracking error signal TE.

The vibration level detection means 9 removes, from the focusing error signal FE and the tracking error signal TE received from the head control means 8, a track cross signal during a seek operation, a signal of an address section of the DVD-RAM disc, and the like. Then, the vibration level detection means 9 detects the amplitudes of the FE signal and the TE signal which each purely represent the residual component after the light beam is controlled to be on the recording track. The vibration level detection means 9 outputs the detection results to the lead angle setting means 11 as vibration levels FEamp and TEamp.

The disc distinguishing means 10 receives an output from the cartridge detection means 3 and the output from the head control means 8, and distinguishes the type of the optical disc 1 inserted into the disc apparatus 100. Specifically, the disc distinguishing means 10 distinguishes whether or not the optical disc 1 inserted into the disc apparatus 100 is accommodated in a cartridge, based on the output from the cartridge detection means 3. Then, the disc distinguishing means 10 distinguishes whether the thickness of the disc is 0.6 mm or 1.2 mm, based on the output pattern of the head control means 8 when the light beam is subjected to the focusing control. Comprehensively considering these results, the disc distinguishing means 10 temporarily determines as follows: when the disc has a thickness of 1.2 mm, the disc is a CD-ROM disc; when the disc has a thickness of 0.6 mm and is not accommodated in a cartridge, the disc is a DVD-ROM disc; and when the disc has a thickness of 0.6 mm and is accommodated in a cartridge, the disc is a DVD-RAM disc. Based on the temporary determination result, the information is actually read from the optical disc 1. Then, based on the disc type data described in a control track of the optical disc 1 which is read from the optical disc 1, the disc type is distinguished. The distinguishing result of the disc distinguishing means 10 is output to the lead angle setting means 11.

The lead angle setting means 11 stores in advance a pattern used for setting a lead angle for each type of optical discs 1. For example, the lead angle setting means 11 stores experimentally determined optimal values, for example, a lead angle of 40 degrees for driving a CD-ROM disc at a maximum rotation rate of 5100 rpm, a lead angle of 20 degrees for driving a DVD-ROM disc at a maximum rotation rate of 3600 rpm, and a lead angle of 0 degrees in the case of a DVD-RAM. For driving a CD-ROM disc and a DVD-ROM disc at a lower rotation rate of 3250 rpm or less, the lead angle is set to 0 degrees. For a DVD-ROM disc and a DVD-RAM disc having a higher recording density, the range of the lead angle is set to be narrower than for a CD-ROM disc having a lower recording density. For a DVD-RAM disc usable for recording and reproduction, the range of the lead angle is set to be narrower than for a DVD-ROM disc usable only for reproduction. This is for reducing the influence of vibration caused by the torque ripple of the brushless motor 5 on the optical disc 1 when the optical disc 1 has a higher recording density. The setting of the lead angle will be described in more detail below with respect to the operation.

Upon receiving the detection result of the disc distinguishing means 10, the lead angle setting means 11 outputs a lead angle in accordance with the disc type to the coefficient setting means 28 of the synthesis means 27. The lead angle setting means 11 also stores in advance tolerable vibration levels FEalw and TEalw, which are different for different types of optical discs 1. In the case of a CD-ROM disc, for example, the lead angle setting means 11 sets an FE voltage corresponding to a defocusing amount of 0.6 μm as FEalw, and a TE voltage corresponding to an off-track amount of 0.06 μm as TEalw. Similarly, in the case of a DVD-ROM disc, the lead angle setting means 11 sets an FE voltage corresponding to a defocusing amount of 0.3 μm as FEalw, and a TE voltage corresponding to an off-track amount of 0.03 μm as TEalw. In the case of a DVD-ROM disc, the lead angle setting means 11 sets an FE voltage corresponding to a defocusing amount of 0.2 μm as FEalw, and a TE voltage corresponding to an off-track amount of 0.015 μm as TEalw.

Upon receipt of the detection result of the disc distinguishing means 10, the lead angle setting means 11 sets tolerable vibration levels FEalw and TEalw in accordance with the type of the optical disc 1. While the brushless motor 5 is rotating, the lead angle setting means 11 always compares the tolerable vibration levels FEalw and TEalw with vibration levels FEamp and TEamp output from the vibration level detection means 9. When at least one of the vibration levels FEamp and TEamp exceeds the tolerable vibration level FEalw or TEalw, the lead angle setting means 11 decreases the lead angle. This operation is repeated until both of the vibration levels FEamp and TEamp are respectively less than the tolerable vibration levels FEalw and TEalw, or until the lead angle becomes 0 degrees.

The rotor position detection means 20 includes three hall elements 21U, 21V and 21W for detecting the magnetic poles of the rotor magnet of the brushless motor 5, and hall amplifiers 22U, 22V and 22W for obtaining the difference between the positive voltage and the negative voltage of the respective hall elements. The hall elements 21U, 21V and 21W are attached to prescribed positions, in a circumferential direction of the rotor magnet, which are deviated by ⅓ of the magnetization cycle. Outputs from the hall elements 21U, 21V and 21W are reduced in noise by the hall amplifiers 22U, 22V and 22W, and then output to the regulation means 24 as three-phase position detection signals HU, HV and HW having phases deviated by 120 degrees with respect to each other.

The regulation means 24 includes low pass filters 25U, 25V and 25W, and AGC (automatic again control) circuits 26U, 26V and 26W. The regulation means 24 reduces a high harmonic component of each of the position detection signals HU, HV and HW from the rotor position detection means 20 and regulates the amplitude of each of the position detection signals HU, HV and HW. As a result, the regulation means 24 outputs generally sine-waved signals SU, SV and SW having a uniform amplitude. The cutoff frequency of each of the lowpass filters 25U, 25V and 25W is variably set by multiplying the rotation frequency of the optical disc 1 by a certain coefficient. In this example, the coefficient is set to 1.2, such that, for example, the cutoff frequency is 72 Hz when the disc rotation rate is 3600 rpm (rotation frequency: 60 Hz) and such that the cutoff frequency is 102 Hz when the disc rotation rate is 5100 rpm (rotation frequency: 85 Hz). The AGC circuits 26U, 26V and 26W perform gain control such that the amplitude of the generally sine-waved signals SU, SV and SW is a prescribed value. The prescribed value is set to be within a rated range of an input to the brushless motor driver 32 described below, and is equal in the AGC circuits 26U, 26V and 26W.

The synthesis means 27 receives a lead angle θ (deg) which is output from the lead angle setting means 11 and synthesizes the generally sine-waved signals SU, SV and SW input from the regulation means 24 in accordance with expression (3) below, so as to generate outputs KU, KV and KW. The outputs KU, KV and KW thus generated have the same amplitude as that of the generally sine-waved signals SU, SV and SW and have phases led with respect to the phases of the signals SU, SV and SW by angle θ (deg).

$$KU = \alpha*SU - \beta*SV$$

$$KV = \alpha*SV - \beta*SW \qquad (3)$$

$$KW = \alpha*SW - \beta*SU$$

Here, α and β are constants, and obtained from the relationships represented by expression (4) where the lead angle is 0 (deg).

$$\alpha = \cos\theta - (1/\sqrt{3})*\sin\theta \qquad (4)$$

$$\beta = \cos(60-\theta) - (1/\sqrt{3})*\sin(60-\theta)$$

More specifically, the synthesis means 27 includes the coefficient setting means 28, multipliers 29U, 29V and 29W, multipliers 30U, 30V and 30W, and subtractors 31U, 31V and 31W. The coefficient setting means 28 stores in advance the relationships represented by expression (4) in a table and outputs coefficients α and β based on an input having a value corresponding to the lead angle θ.

The multipliers 29U, 29V and 29W respectively multiply the outputs SU, SV and SW from the regulation means 24 by α. The multipliers 30U, 30V and 30W respectively multiply the outputs SU, SV and SW from the regulation means 24 by β. The multipliers 29U, 29V, 29W, 30U, 30V and 30W each include a combination of an amplification ratio varying device and an amplifier. The subtractors 31U, 31V and 31W are differential amplifiers for respectively obtaining differences between the outputs from the multipliers 29U, 29V and 29W and the outputs from the multipliers 30U, 30V and 30W.

The three-phase full-wave brushless motor driver 32 of a 180° or 120° PWM driving system generates a driving signal for driving the brushless motor 5 in synchronization with the received three-phase position detection signals (i.e., the outputs KU, KV and KW).

The disc apparatus 100 having the above-described structure operates as follows.

When the power of the disc apparatus 100 is turned or when the optical disc 1 is loaded by the loading mechanism, the disc distinguishing means 10 distinguishes the disc type.

First, the operation of the disc apparatus 100 when the disc is a CD-ROM disc will be described. When the disc distinguishing means 10 detects that the disc is a CD-ROM disc, the brushless motor control means 33 accelerates the brushless motor 5 to a maximum rotation rate of 5100 rpm in a two-stage acceleration procedure as follows.

In a first stage, the target rotation rate of the brushless motor 5 is set to 3250 rpm. Simultaneously, the lead angle setting means 11 sets the lead angle to 0 degrees. Then, the lead angle correction means 23 does not substantially correct the lead angle. The brushless motor driver 32 translocates the driving current with the same phase as that of the output from the rotor position detection means 20, thereby accelerating the brushless motor 5.

When the rotation rate of the brushless motor 5 reaches 3250 rpm, a second stage is started. The brushless motor control means 33 sets the target rotation rate of the brushless motor 5 to be 5100 rpm. The lead angle setting means 11 outputs a set value of the lead angle of 40 degrees to the coefficient setting means 28. Based on expression (4), the coefficient setting means 28 outputs α=0.395 and β=0.742, and sets the coefficient of the multipliers 29U, 29V and 29W to the value of α and sets the coefficient of the multipliers 30U, 30V and 30W to the value of β. The outputs HU, HV and HW from the rotor position detection means 20 each have the high harmonic component reduced by the regulation means 24, and are output as generally sine-waved signals SU, SV and SW having a uniform amplitude. The generally sine-waved signals SU, SV and SW are converted by the synthesis means 27 into the outputs KU, KV and KW provided with the lead angle of 40 degrees. Based on the outputs KU, KV and KW, the brushless motor driver 32 translocates the driving current. Thus, the delay in excitation caused by the inductance component of the stator coil (not shown) is corrected. The correction, in combination with the effect of the inverse electromotive force being reduced by the weak field, expands the range of rotation rates of the motor, thus accelerating the brushless motor 5 up to the target rotation rate of 5100 rpm.

In this state, the head control means 8 controls the light beam to be on a desired recording track of the optical disc 1 (i.e., the CD-ROM disc), and outputs the focusing error signal FE and the tracking error signal TE to the vibration level detection means 9. The vibration level detection means 9 detects the amplitudes of the focusing error signal FE and the tracking error signal TE, and then outputs the detected amplitudes to the lead angle setting means 11 as the vibration levels FEamp and TEamp. The lead angle setting means 11 compares the received vibration levels FEamp and TEamp with the tolerable vibration levels FEalw and TEalw. When the vibration level FEamp or TEamp is higher than the tolerable vibration level FEalw or TEalw, the lead angle is decreased until the vibration levels FEamp and TEamp become equal to or less than the tolerable vibration levels FEalw and TEalw.

Owing to the above-described structure, even when the unnecessary vibration exceeds the tolerable vibration level FEalw or TEalw, due to the torque ripple caused by the lead angle depending on the individual variance in characteristics of the brushless motor 5 and the optical disc 1, this is detected without fail and the lead angle is decreased so as to restrict the vibration level to be equal to or less than the tolerable vibration level. Thus, the disc apparatus 100 having a high reliability of data reproduction can be provided.

In the case where the lead angle is decreased as described above, the rotation rate of the brushless motor 5 is decreased to be lower than the target rotation rate of 5100 rpm. However, this merely causes a slight adverse effect that the reading speed of information from the optical disc 1 is reduced. The reliability of the entire system of the disc apparatus 100 is not deteriorated.

In this example, the vibration level detection means 9 detects the unnecessary vibration, and the lead angle setting means 11 sets a magnitude of the lead angle in accordance with the detected unnecessary vibration. Thus, despite the individual variances of the brushless motor 5 and the optical disc 1, the lead angle can be effectively set within a tolerable range and the unnecessary vibration can be restricted to be equal to or less than a prescribed level with certainty. Therefore, there liability of the disc apparatus 100 can be guaranteed.

The brushless motor control means 33 performs a CAV (constant angular velocity) control on a CD-ROM disc, so as to maintain the rotation rate of the brushless motor 5 regardless of the speed of the seek operation. Therefore, it is not necessary to change the setting of the lead angle except for when the disc apparatus 100 is started. Thus, the lead angle can be set in a simple manner as described above.

In the case where the vibration level FEamp or TEamp is still higher than the tolerable vibration levels even when the lead angle is decreased to 0 degrees, the brushless motor control means 33 sets the target rotation rate of the brushless motor 5 to a lower level (for example, 2500 rpm, which is approximately half of 5100 rpm), and the lead angle setting means 11 sets the lead angle to 0 degrees. Then, the brushless motor 5 is re-started.

Next, the operation of the disc apparatus 100 when the disc distinguishing means 10 detects that the disc is a DVD-ROM disc will be described. In this case, the brushless motor control means 33 accelerates the brushless motor 5 to a maximum rotation rate of 3600 rpm in a two-stage acceleration procedure in substantially the same manner as in the case of the CD-ROM disc.

In a first stage, the brushless motor control means 33 sets the target rotation rate of the brushless motor 5 to be 3250 rpm. Simultaneously, the lead angle setting means 11 sets the lead angle to 0 degrees. When the rotation rate of the brushless motor 5 reaches 3250 rpm, a second stage is started. The brushless motor control means 33 sets the target rotation rate of the brushless motor 5 to be 3600 rpm. The lead angle setting means 11 outputs a set value of the lead angle of 20 degrees to the coefficient setting means 28. The coefficient setting means 28 sets $\alpha=0.742$ as the coefficient of the multipliers 29U, 29V and 29W and sets $\beta=0.395$ as the coefficient of the multipliers 30U, 30V and 30W. The outputs HU, HV and HW from the rotor position detection means 20 are converted into the outputs KU, KV and KW provided with the lead angle of 20 degrees. The lead angle of 20 degrees is determined as a value for correcting the delay in excitation by the inductance component of the stator coil (not shown) and provides substantially no effect as a weak field current. Therefore, the torque ripple does not significantly increase. At this setting, the brushless motor 5 is accelerated up to the target rotation rate of 3600 rpm.

In this state, the head control means 8 controls the light beam to be on a desired recording track of the optical disc 1 (i.e., the DVD-ROM disc), and outputs a focusing error signal FE and a tracking error signal TE to the vibration level detection means 9. The vibration level detection means 9 detects the amplitudes of the focusing error signal FE and the tracking error signal TE, and then outputs the detected amplitudes to the lead angle setting means 11 as the vibration levels FEamp and TEamp. The lead angle setting means 11 compares the received vibration levels FEamp and TEamp with the tolerable vibration levels FEalw and TEalw. When the vibration level FEamp or TEamp is higher than the tolerable vibration level FEalw or TEalw, the lead angle is decreased until the vibration levels FEamp and TEamp become equal to or less than the tolerable vibration levels FEalw and TEalw.

When a DVD-ROM disc having a higher recording density is used, the lead angle is initially set to be smaller and the tolerable vibration level is set to be lower than when a CD-ROM disc having a lower recording density is used. In this manner, the highest possible performance can be derived from the disc apparatus 100 for different types of optical discs 1 while guaranteeing the reliability of the disc apparatus 100 against unnecessary vibrations.

In this example, the lead angle is varied in accordance with the output from the vibration level detection means 9. The present invention also provides an effect which is not provided by the prior art even when the disc apparatus 100 does not include the vibration level detection means 9. Specifically, as described above, the present invention provides the structure of initially setting the lead angle for a first disc having a higher recording density to be smaller than for a second disc having a lower recording density. This structure itself derives the highest possible performance of the disc apparatus 100 for both the second disc having a higher durability against vibration and the first disc having a lower durability against vibration. Thus, the reliability of the disc apparatus 100 against unnecessary vibrations is improved.

Like in the case of the CD-ROM disc, the brushless motor control means 33 performs a CAV control on the DVD-ROM disc, so as to maintain the rotation rate of the brushless motor 5 regardless of the speed of the seek operation. In the case where the vibration levels are still higher than the tolerable vibration levels even when the lead angle is decreased to 0 degrees, the brushless motor control means 33 sets the target rotation rate of the brushless motor 5 to be a lower level (for example, 1800 rpm, which is half of 3600 rpm), and the lead angle setting means 11 sets the lead angle to 0 degrees. Then, the brushless motor 5 is re-started.

Next, the operation of the disc apparatus 100 when the disc distinguishing means 10 detects that the disc is a DVD-RAM disc will be described. In this case, the lead angle setting means 11 sets the lead angle to 0 degrees, and the brushless motor 5 is always driven without any correction of the lead angle. The brushless motor control means 33 drives the brushless motor 5 with ZCLV (Zoned Constant Linear Velocity) control. When the optical head 6 is above an innermost position of the DVD-RAM disc, the disc rotation rate is set to 3250 rpm. When the optical head 6 is above an outermost position of the DVD-RAM disc, the disc rotation rate is set to 1350 rpm. The disc rotation rate can always be varied within the range between 3250 rpm and 1350 rpm in accordance with the position of the optical head 6. As described above, the brushless motor 5 is designed to have optimal motor's characteristics assuming a certain rotation rate range in which the brushless motor 5 is used. Therefore, the time required for changing the rotation rate of the disc, accompanied by the seek operation, can be shortened.

The rotation rate of the brushless motor 5 is frequently changed, but the control is simple. The reason is that since the lead angle is set to 0 degrees when a DVD-RAM disc is used, it is not necessary to change the setting of the lead angle in the disc apparatus 100.

In addition, the lead angle is set to be smaller when an information recording and reproduction disc such as, for example, a DVD-RAM disc usable for reproduction and reproduction is used than when an information reproduction-only disc such as, for example, a DVD-ROM disc usable only for reproduction is used. Therefore, the highest possible performance can be derived from the disc apparatus 100 for both a reproduction-only disc having a higher durability against vibration and a recording and reproduction disc having a lower durability against vibration. Thus, the reliability of the disc apparatus 100 against unnecessary vibrations is improved.

As described above, in this example, the vibration level detection means 9 detects the unnecessary vibration, and the lead angle setting means 11 sets a magnitude of the lead angle in accordance with the detected unnecessary vibration. Thus, despite the individual variances of the brushless motor 5 and the optical disc 1, the lead angle can be effectively set within a tolerable range and the unnecessary vibration can be restricted to be equal to or less than a prescribed level with certainty. Therefore, the reliability of the disc apparatus 100 can be guaranteed.

Since the magnitude of the lead angle is set in accordance with the output from the disc distinguishing means 10, an optimal lead angle is set for each of different types of discs having different levels of durability against vibration. Thus, the highest possible performance of the disc apparatus 100 can be derived for each type of disc. In addition, it can be distinguished whether the disc is of the ZCLV rotation control system or of the CAV rotation control system as well as the type of disc. Therefore, the lead angle can be set in a simple manner, utilizing the features of each rotation control system. In this example, the lead angle can be set with a significantly simpler circuit configuration than by the conventional system of uniformly setting the lead angle in accordance with the rotation rate.

The outputs from the rotor position detection means 20 are synthesized by the synthesis means 27 after the amplitudes thereof are uniformized and the high harmonic components thereof are removed by the regulation means 24. Therefore, even when the outputs from the rotor position detection means 20 have variance in amplitudes or distortion in waveforms, such factors tend not to influence the setting precision of the lead angle in each phase. Thus, a highly precise correction of the lead angle can be performed.

In this example, the brushless motor driver 32 drives the brushless motor 5 at a power supply voltage of 5 V, and the brushless motor 5 has a coiled structure which provides an optimal performance under this condition. When the brushless motor driver 32 drives the brushless motor 5 at a power supply voltage of 12 V and the brushless motor 5 is structured so as to provide an optimal performance under this condition, the motor can be rotated at a higher rate by providing the brushless motor 5 with a lead angle. For reproducing information from a CD-ROM disc, for example, a rotation rate equal to or greater than 9000 rpm (equal to or greater than x42) can be realized.

EXAMPLE 2

Figure 2:
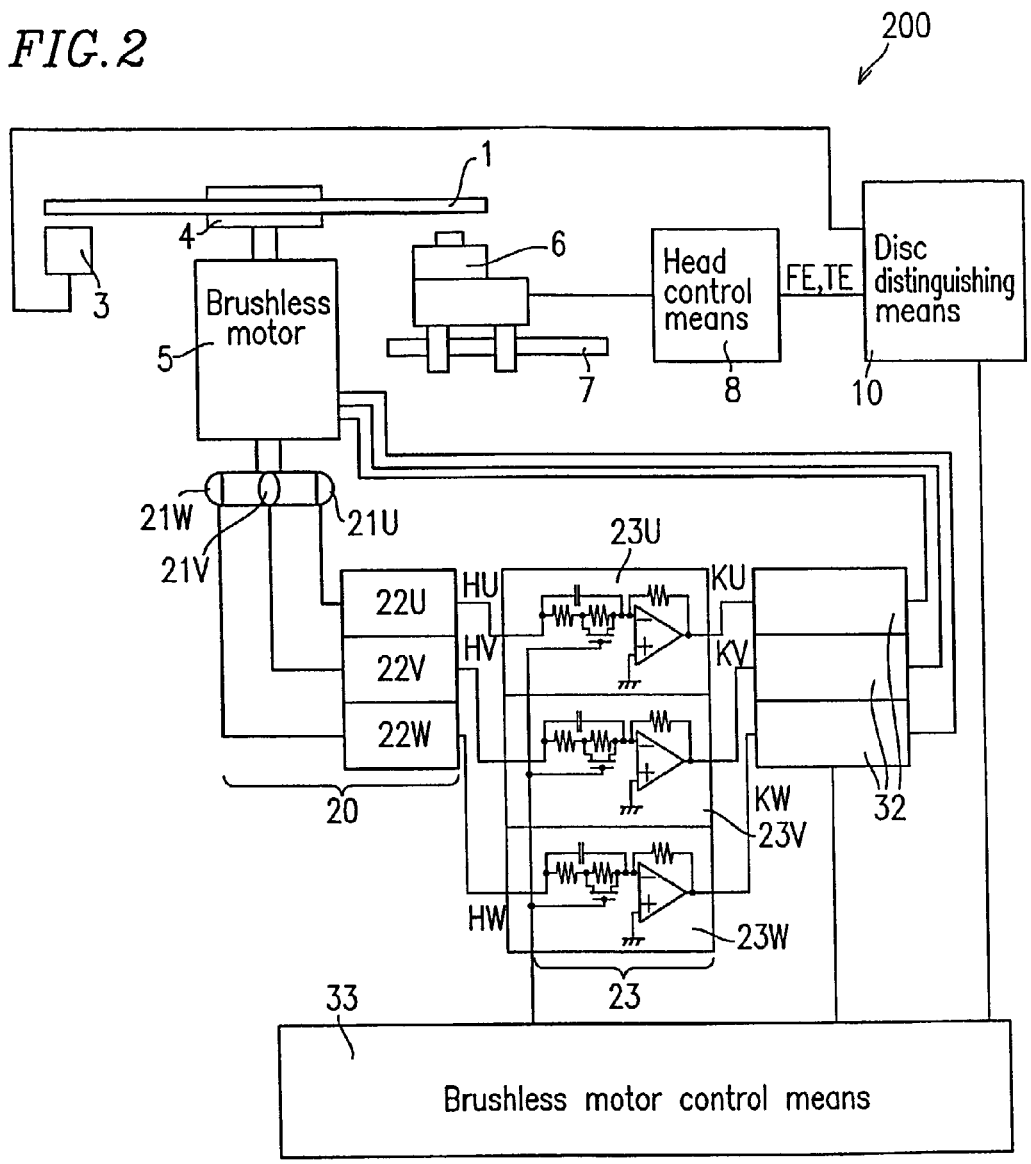
FIG. 2 shows an optical disc apparatus according to a second example of the present invention.

FIG. 2 is a schematic structural view of a disc apparatus 200 according to a second example of the present invention.

Identical elements previously discussed bear identical reference numerals. In this example, though, the brushless motor 5 and the brushless motor driver 32 may be driven at a power supply of 12 V. The disc apparatus 200 can reproduce information on a CD-ROM disc at a speed of x42 or higher.

The disc apparatus 200 does not include the vibration level detection means 9 (FIG. 1), and a focusing error signal FE and a tracking error signal TE output from the head control means 8 are input to the disc distinguishing means 10. The distinguishing result of the disc distinguishing means 10 is output to the brushless motor control means 33.

The brushless motor control means 33 controls the entire disc apparatus 200 by controlling, for example, the lead angle correction means 23 and the brushless motor driver 32. The position detection signals HU, HV and HW from the rotor position detection means 20 are output to the lead angle correction means 23.

Figure 3:
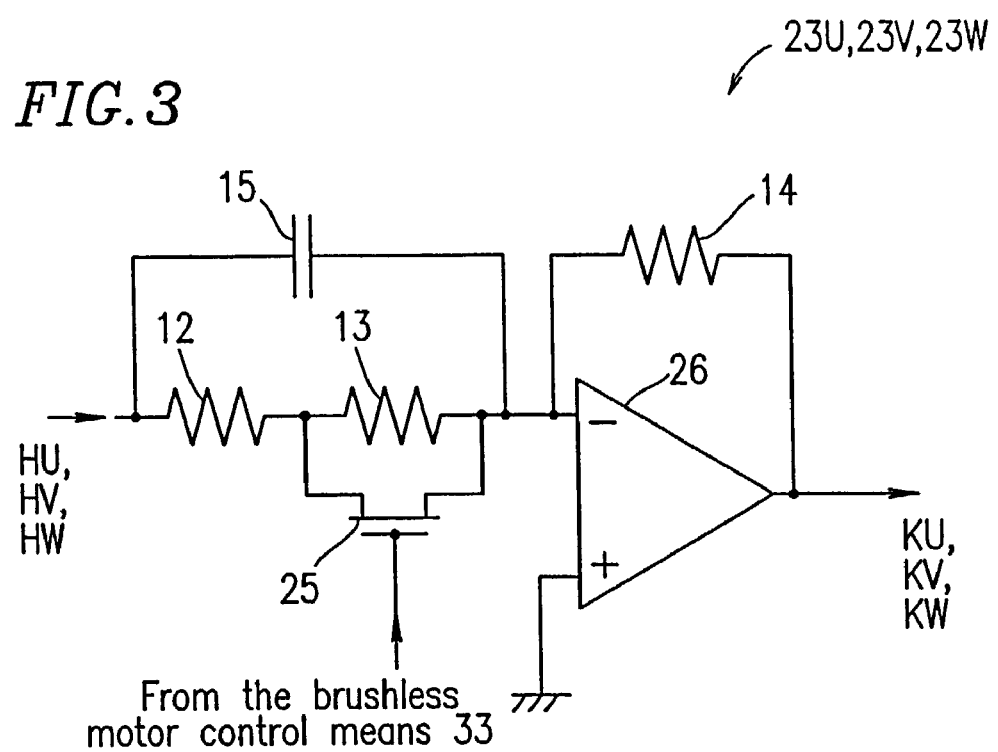
FIG. 3 shows a phase leading circuit in the second example of the present invention.

The lead angle correction means 23 includes phase leading circuits 23U, 23V and 23W. As shown in FIG. 3, the phase leading circuits 23U, 23V and 23W each include a first time constant determination resistor 12, a second time constant determination resistor 13, again determination resistor 14, a capacitor 15, an FET 25, and an operation amplifier 26. A differentiation circuit includes the first time constant determination resistor 12, the second time constant determination resistor 13, and the capacitor 15. The phase leading circuits 23U, 23V and 23W respectively receive position detection signals HU, HV and HW, and output position detection signals KU, KV and KW. The position detection signals KU, KV and KW are obtained by correcting the lead angles of the position detection signals HU, HV and HW. In this example, two time constant determination resistors may be used (in FIG. 3, the first time constant determination resistor 12, the second time constant determination resistor 13). One of the two resistors (in FIG. 3, the second time constant determination resistor 13) is connected to the FET 25 in parallel. The FET 25 has a gate, which is structured to be shortcircuited when provided with a bias sufficient to turn ON the FET 25 by a signal from the brushless motor control means 33. Owing to this structure, the time constant of each of the phase leading circuits 23U, 23V and 23W, i.e., the relationship between the rotation rate and the lead angle can be switched between two states. The circuit constant, i.e., the differentiation constant, can be changed by shortcircuiting or turning OFF the second time constant determination resistor 13 by the FET 25.

With reference to FIG. 3, the structure and function of the phase leading circuits 23U, 23V and 23W will be described in more detail. FIG. 3 shows a circuit configuration of the phase leading circuit 23U, 23V, 23W. Since the phase leading circuits 23U, 23V and 23W are identical to each other, the disc apparatus 200 includes three phase leading circuits.

Without considering the FET 25, the phase leading circuits 23U, 23V and 23W are identical to a general phase leading circuit. The lead angle θ (deg) is represented by expression (5) below, where R(Ω) is the sum of a resistance value of the first time constant determination resistor 12 and a resistance value of the second time constant determination resistor 13, C(F) is the capacitance of the capacitor 15, and n(rpm) is the rotation rate of the brushless motor 5 (FIG. 1).

$$\theta = \tan^{-1}(R/Z)$$

$$Z = 1/2\pi fC \quad (5)$$

$$f = 0.1n$$

Here, f is the frequency (Hz) of each of the position detection signals HU, HV and HW at the rotation rate n(rpm) of the brushless motor 5. Z is the impedance (Ω) of the capacitor 15 in this state.

As can be appreciated from expression (5), the phase lead angle θ simply increases as the rotation rate n increases. The phase lead angle θ increases as the value of R increases. The delay in the current caused by the coil inductance component of the brushless motor 5 increases as the rotation rate increases. The inverse electromotive force of the brushless motor 5 also increases in proportion to the rotation rate of the brushless motor 5. Therefore, the above-described characteristics that the phase lead angle θ simply increases as the rotation rate increases and as the value of R increases are advantageous both for (i) correcting the delay in the current caused by the coil inductance and for (ii) further leading the phase so as to provide the effect of the weak field.

Owing to the above-described characteristics, a sufficiently large phase lead angle for high-rate rotation can be realized, while avoiding failure in starting the brushless motor 5, insufficient torque caused by unnecessary leading of the phase during low-rate rotation, and excessive vibration. In addition, the phase lead angle is changed automatically by the phase lead angle circuits 23U, 23V and 23W. Therefore, load on the control means is insignificant. The phase lead angle circuits 23U, 23V and 23W can be realized with a very simple structure.

The FET 25, when provided with a sufficient bias by a signal from the brushless motor control means 33, can make the source-drain resistance value almost zero. When not provided with a bias, the source-drain resistance value is substantially infinite. As shown in FIG. 3, the source and the drain of the FET 25 is connected parallel to the second time constant determination resistor 13. Therefore, the FET 25 can shortcircuit the second time constant determination resistor 13 when provided with a sufficient bias by a signal from the brushless motor control means 33.

When the second time constant determination resistor 13 is shortcircuited, the value of R in expression (5) is equal to the value of the first time constant determination resistor 12. When the FET 25 is not provided with a bias, the value of R is equal to the sum of the value of the first time constant determination resistor 12 and the value of the second time constant determination resistor 13. Thus, the time constant of each of the phase leading circuits 23U, 23V and 23W, i.e., the relationship between the rotation rate and the lead angle, can be switched between two states. As can be appreciated from FIG. 3, the function of changing the time constant of each of the phase leading circuits 23U, 23V and 23W can be realized with a very simple structure.

In the case where the optical disc 1 is a DVD-RAM disc, the rotation rate of the optical disc 1 is as low as 3250 rpm, whereas the rotation rate for the seek operation needs to be changed for ZCLV control. Accordingly, a high speed seek operation requires a large torque. The brushless motor 5 is designed so as to generate a torque sufficiently large for this purpose at a normal driving voltage. Thus, the phase lead angle in this case can be as small as an angle used for correcting the delay in the current caused by the coil inductance component. By providing the brushless motor 5 with such a small lead angle, the torque can be further improved.

In this example, the lead angle is set to 7 degrees at 3250 rpm. In order to realize the lead angle of 7 degrees, it is necessary that C=0.01 μF and R=6 kΩ in expression (5).

In order to realize the rotation rate of 9000 rpm which is required for x42 reproduction of information from the CD-ROM disc, the phase lead angle needs to be further increased such that the effect of the weak field is provided. In this example, the lead angle is set to 50 degrees at 9000 rpm. In order to realize the lead angle of 50 degrees, it is necessary that C=0.01 μF and R=21 kΩ in expression (5).

As described above, each constant varies depending on whether the optical disc 1 is a DVD-RAM disc or a CD-ROM disc. If the constants are fixed for either type of disc, the torque is insufficient or the maximum rotation rate is not obtained.

In this example, the value of the first time constant determination resistor 12 is set to 6 kΩ, which is required for a DVD-RAM, and the value of the second time constant determination resistor 13 is set to 15 kΩ. The resistance value which is required for performing x42 reproduction of information from a CD-ROM is 21 kΩ. The difference between 6 kΩ and 21 kΩ is determined as the value of the second time constant determination resistor 13.

Owing to such a setting, when the FET 25 is provided with a sufficient bias, the lead angle is 7 degrees at 3250 rpm, which is suitable to a DVD-RAM disc. This is represented by characteristic 27 in FIG. 12. When the FET 25 is not provided with any bias, the lead angle is 50 degrees at 9000 rpm, which is suitable to a x42 reproduction of CD-ROM disc. This is represented by characteristic 28 in FIG. 12.

The gain determination resistor 14 determines the overall amplification ratio. The amplification ratio varies in accordance with the rotation rate. When a CD-ROM disc is used and the gain resistance value is 10 kΩ, the amplification ratio is 0.48 at 0 rpm and 0.74 at 9000 rpm. Such a variation does not significantly influence the characteristics of the brushless motor 5.

The phase leading circuits 23U, 23V and 23W invert phases in this example. The brushless motor 5 is designed so as to accommodate for the inversion.

With reference to FIGS. 2 and 3, an operation of the disc apparatus 200 having the above structure will be described. When the power of the disc apparatus 200 is turned on or the optical disc 1 is loaded by a loading mechanism (not shown), the disc distinguishing means 10 distinguishes the disc type.

First, the operation of the disc apparatus 200 when the disc is a CD-ROM disc will be described. When the disc distinguishing means 10 detects that the disc is a CD-ROM disc, the brushless motor control means 33 sets the bias provided to the FET 25 of the lead angle correction means 23 to zero, thereby switching the time constants of the phase lead angle circuits 23U, 23V and 23W to a value preferable for reproducing information from the CD-ROM disc.

Figure 12:
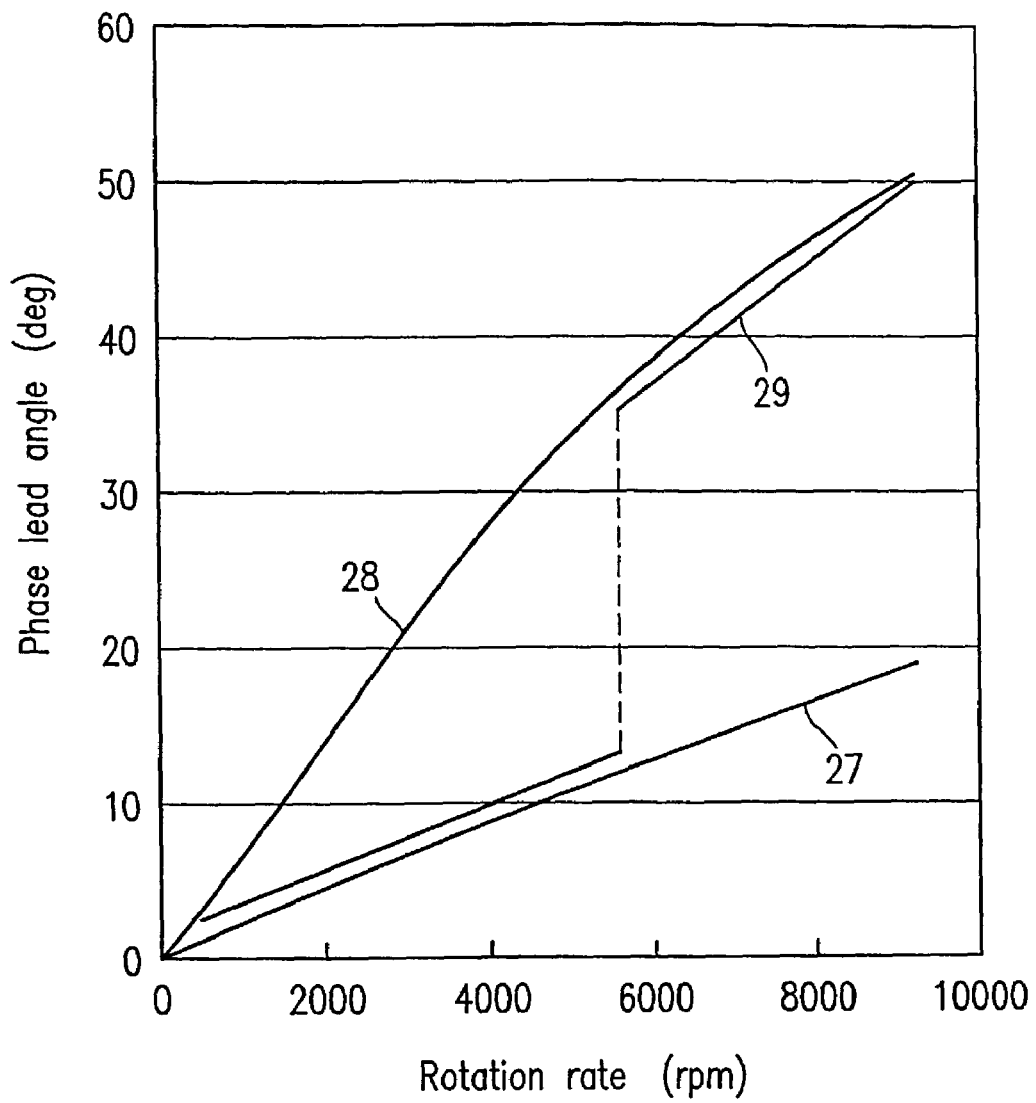
FIG. 12 shows the relationship between the rotation rate and the lead angle obtained by a phase leading circuit.

When the brushless motor 5 is started to start rotating the optical disc 1, the lead angle is stable at 0 degrees as represented by characteristic 28 in FIG. 12. As the rotation rate increases, the phase gradually leads. Thus, the brushless motor 5 is driven in an optical weak field. This increases the rotation rates, which continuously accelerates the brushless motor 5.

During this period, the brushless motor control means 33 merely controls the driving voltage while monitoring the rotation rate. Namely, the brushless motor 5 can be accelerated up to 9000 rpm by exactly the same control as the usual control.

When the disc is a DVD-ROM disc, the brushless motor 5 is driven by basically the same procedure as in the case of the CD-ROM disc except that the rotation rate is different.

Next, the operation of the disc apparatus 200 when the disc is a DVD-RAM disc will be described. In this case also, the brushless motor 5 is driven by basically the same procedure as in the case of the CD-ROM disc except that the rotation rate is different. When the disc distinguishing means 10 detects that the disc is a DVD-RAM disc, the brushless motor control means 33 provides the FET 25 of the lead angle correction means 23 with a sufficient bias. This switches the time constants of the phase lead angle circuits 23U, 23V and 23W to a value preferable for recording information to and reproducing information from the DVD-RAM disc. As a result, the relationship between the rotation rate and the phase lead angle as represented by characteristic 27 in FIG. 12 is obtained.

When the brushless motor 5 is started to start rotating the optical disc 1, the lead angle is stable at 0 degrees as represented by characteristic 27 in FIG. 12. As the rotation rate increases, the phase gradually leads. Thus, the brushless motor 5 is driven with the delay in the current caused by the coil inductance component being corrected. This increases the rotation rate of the brushless motor 5.

The brushless motor control means 33 drives the brushless motor 5 with ZCLV control. When the optical head 6 is above an innermost position of the DVD-RAM disc, the disc rotation rate is set to 3250 rpm. When the optical head 6 is above an outermost position of the DVD-RAM disc, the disc rotation rate is set to 1350 rpm. The disc rotation rate can always be varied within the range between 3250 rpm and 1350 rpm in accordance with the position of the optical head 6. As described above, the brushless motor 5 is designed to have optimal motor's characteristics assuming a certain rotation rate range in which the brushless motor 5 is used. The brushless motor 5 is also driven with the delay in the current caused by the coil inductance component being corrected. Therefore, the time required for changing the rotation rate of the disc, accompanied by the seek operation, can be shortened.

The rotation rate of the brushless motor 5 is frequently changed, but the control is simple for the following reason. In order to correct the delay in the current caused by the inductance component, the lead angle is automatically changed by the function of the lead angle correction means 23 as described above. Therefore, it is not necessary that the setting of the lead angle be changed by the brushless motor control means 33 in the disc apparatus 200.

As described above, in the second example, the relationship between the magnitude of the lead angle and the rotation rate can be switched by the lead angle correction means 23 in accordance with the output from the disc distinguishing means 10. Since the brushless motor 5 can be driven by being provided with the optimal lead angle corresponding to the rotation rate of each type of disc, the highest possible performance of the brushless motor 5 can be derived. Even when different rotation control systems, such as the ZCLV rotation control system and the CAV rotation control system, are used for different types of optical discs 1, the same control can be performed as in the conventional disc apparatus. Therefore, the load on the brushless motor control means 33 is insignificant. The entire structure of the disc apparatus 200 is simple and easy to realize.

EXAMPLE 3

Figure 4:
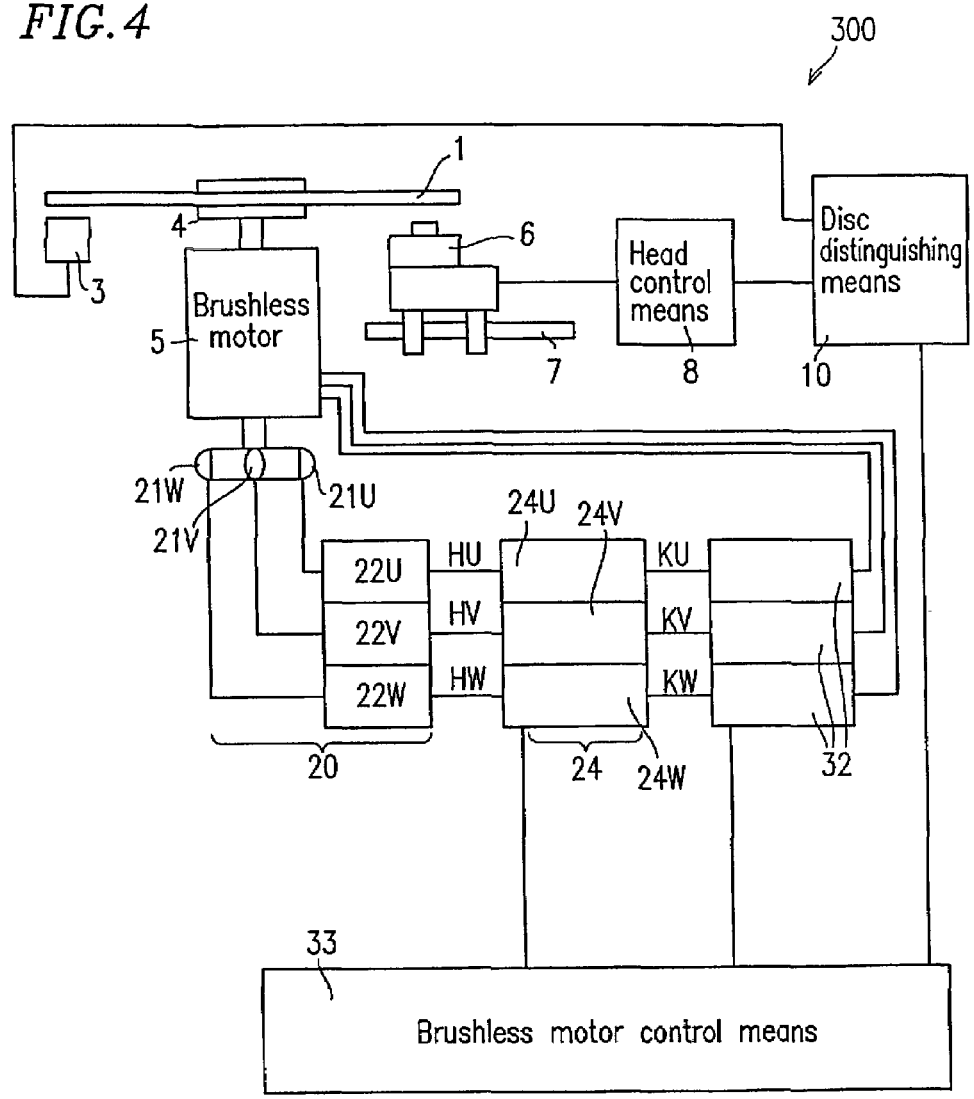
FIG. 4 shows an optical disc apparatus according to a third example of the present invention.

FIG. 4 is a schematic structural view of a disc apparatus 300 in a third example of the present invention. The disc apparatus 300 in this example can record information on and reproduce information from a DVD-RAM disc, and reproduce information from a CD-ROM disc at a speed of x42 or higher.

The structure of the disc apparatus 300 in this example is basically the same as that of the disc apparatus 200.

The disc apparatus 300 is different from the disc apparatus 200 in lead angle correction means 24. Whereas the lead angle correction means 23 includes a differentiation circuit in the disc apparatus 200, the lead angle correction means 24 in the disc apparatus 300 includes an integration circuit.

Figure 5:
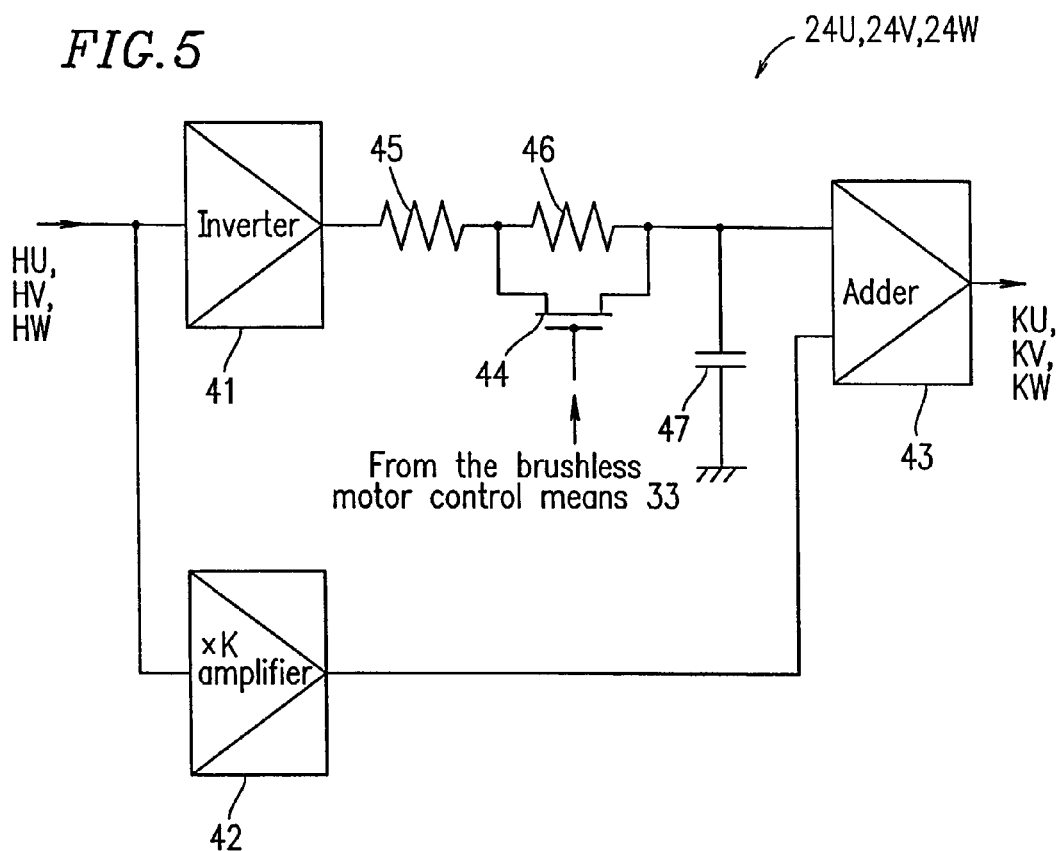
FIG. 5 shows a phase leading circuit in the third example of the present invention.
Figure 6:
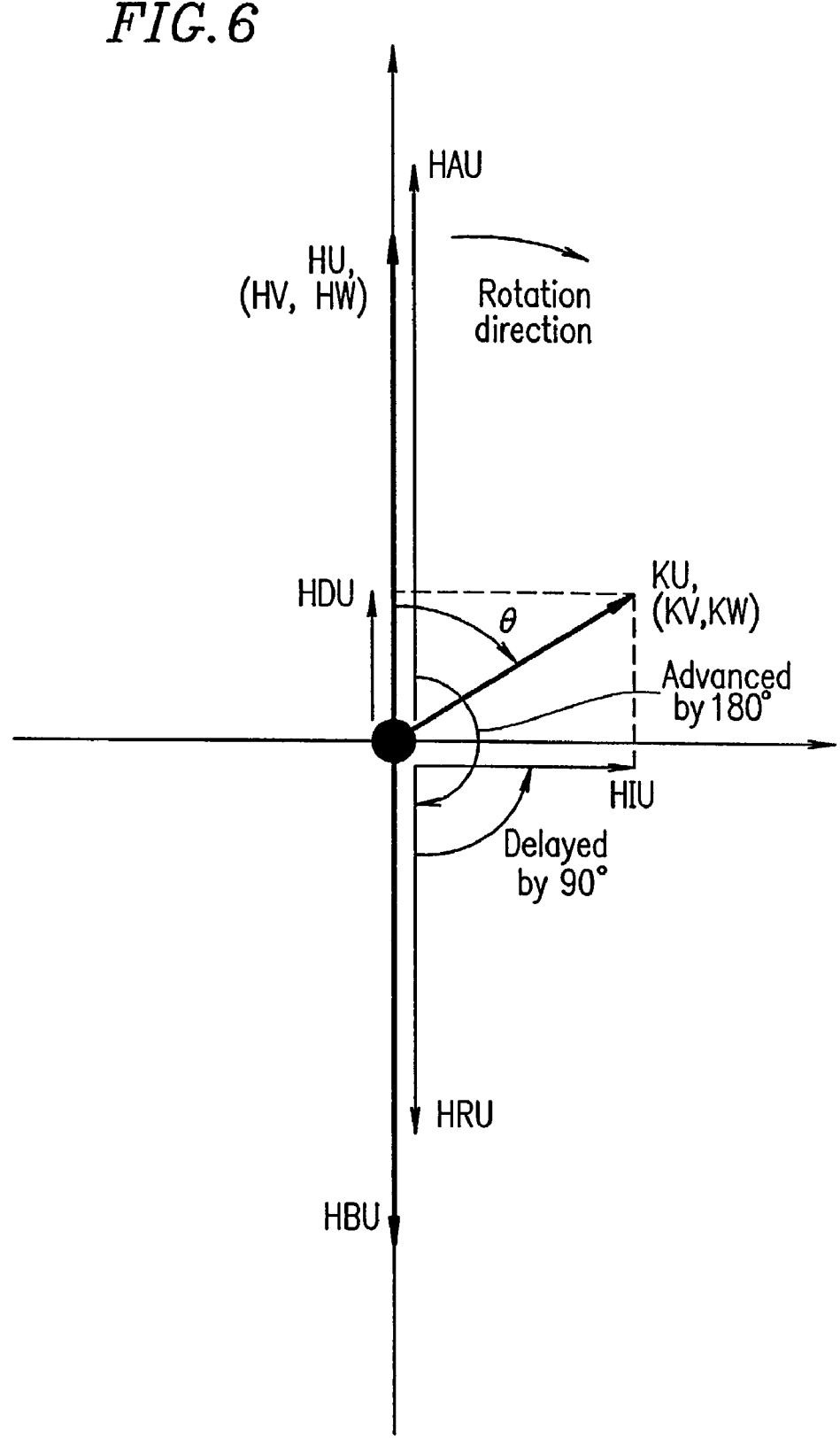
FIG. 6 shows a phase relationship among signals received and output by lead angle correction means in the third example of the present invention.

With reference to FIGS. 5 and 6, the structure and function of the lead angle correction means 24 will be described in detail. FIG. 5 shows a structure of each of phase lead angle circuits 24U, 24V and 24W included in the lead angle correction means 24. Since the phase leading circuits 24U, 24V and 24W are identical to each other, the disc apparatus 300 includes three phase leading circuits.

The phase lead angle circuits 24U, 24V and 24W each include an inverter 41, an amplifier 42, an adder 43, an FET 44, a first time constant determination resistor 45, a second time constant determination resistor 46, and a capacitor 47. The inverter 41 inverts the position detection signals HU, HV, HW from the rotor position detection means 20 (FIG. 4) so as to lead the phases of the signals by 180 degrees. The amplification ratio of the amplifier 42 is K.

An integration circuit includes the first time constant determination resistor 45, the second time constant determination resistor 46, and the capacitor 47. By shortcircuiting or turning OFF the second time constant determination resistor 46 using the FET 44, the circuit constant, i.e., the integration constant, can be changed.

With reference to FIG. 6, an operation of the phase lead angle circuit 24U, 24V, 24W will be described in more detail. FIG. 6 is a vector diagram illustrating the phase relationship among signals received and output by the lead angle correction means 24. In FIG. 6, the position detection signal HU is one of the outputs from the rotor position detection means 20 and is the position detection signal HU shown in FIG. 4. The position detection signals HV and HW in FIG. 6 are respectively the position detection signals HV and HW shown in FIG. 4. A signal HBU is an output signal from the inverter 41. A signal HRU is a signal component in an output signal applied to both of two ends of the capacitor 47. The signal HRU has the same phase as that of the signal HBU. A signal HIU is a signal component in the output signal applied to both of two ends of the capacitor 47. The signal HIU has a phase delayed by 90 degrees with respect to the signal HBU. A signal HAU is an output signal from the amplifier 42. A signal HDU is a signal component corresponding to the difference between the signal HAU and the signal HRU. The position detection signal KU is an output signal from the adder 43 and is the position detection signal KU which is output from the phase lead angle correction means 24 in FIG. 4. The position detection signals KV and KW in FIG. 6 are respectively the position detection signals KV and KW shown in FIG. 4.

The phase and amplitude of the output from the rotor position detection means 20 which is received and output by the lead angle correction means 24 are represented by the position detection signal HU, and the lead angle thereof is 0 degrees. The position detection signal HU is input to and inverted by the inverter 41. As a result, the phase of the position detection signal HU is led by 180 degrees. The resultant signal is represented as the signal HBU. The signal HBU is input to the integration circuit including the first time constant determination resistor 45, the second time constant determination resistor 46 and the capacitor 47.

The output from the integration circuit applied to both of two ends of the capacitor 47, and includes the signal HRU having the same phase as that of the signal HBU, and the signal HIU having a phase delayed by 90 degrees with respect to that of the signal HBU. The signal HIU is led by 90 degrees with respect to the position detection signal HU output from the rotor position detection means 20. The position detection signal HU is input to the amplifier 42 and amplified by K so as to be the signal HAU.

The output from the integration circuit, which includes the signal HRU and the signal HIU, and the signal HAU output from the amplifier 42 are input to and added together by the adder 43. By the addition, the signal HRU and the signal HAU counteract each other. As a result, the signal HDU remains. The signal HIU is output as it is. Thus, the position detection signal KU including the signal HDU and the signal HIU as components and having a lead angle θ is output.

When the time constant of the integration circuit including the first time constant determination resistor 45, the second time constant determination resistor 46 and the capacitor 47 is set to be sufficiently smaller than the cycle of the position detection signal HU from the rotor position detector means 20 (1/900 Hz=1.11 ms), the signal HRU has the same value as that of the signal HBU without substantially relying on the frequency. The signal HIU has an amplitude substantially in proportion to the frequency. Therefore, by setting the amplification ratio K of the amplifier 42 to an appropriate value greater than 1, the signal HDU has the same phase as that of the output from the rotor position detection means 20 and a constant amplitude regardless of the frequency. The signal HIU is led by 90 degrees with respect to the signal HDU, and the amplitude thereof increases in proportion to the frequency. Therefore, the lead angle θ of the position detection signal KU having the signal HDU and the signal HIU as components increases as the frequency increases.

Like in the second example, in order to realize the rotation rate of 9000 rpm which is required for x42 reproduction of information from the CD-ROM disc, the constants are set as follows. The sum of a resistance value of the first time constant determination resistor 45 and a resistance value of the second time constant determination resistor 46 is set to 1 kΩ; the value of the capacitor 47 is set to 0.03 µF; and K is set to 1.1. Thus, substantially the same phase characteristics as those in the second example are obtained. In order to obtain substantially the same characteristics as those in the second example which are suitable to recording of information to and reproduction of information from a DVD-RAM disc, the constants are set as follows. The sum of a resistance value of the first time constant determination resistor 45 and a resistance value of the second time constant determination resistor 46 is set to 200 Ω; and the other constants are set to the same values as those used for x42 reproduction of information from the CD-ROM disc.

Figure 7:
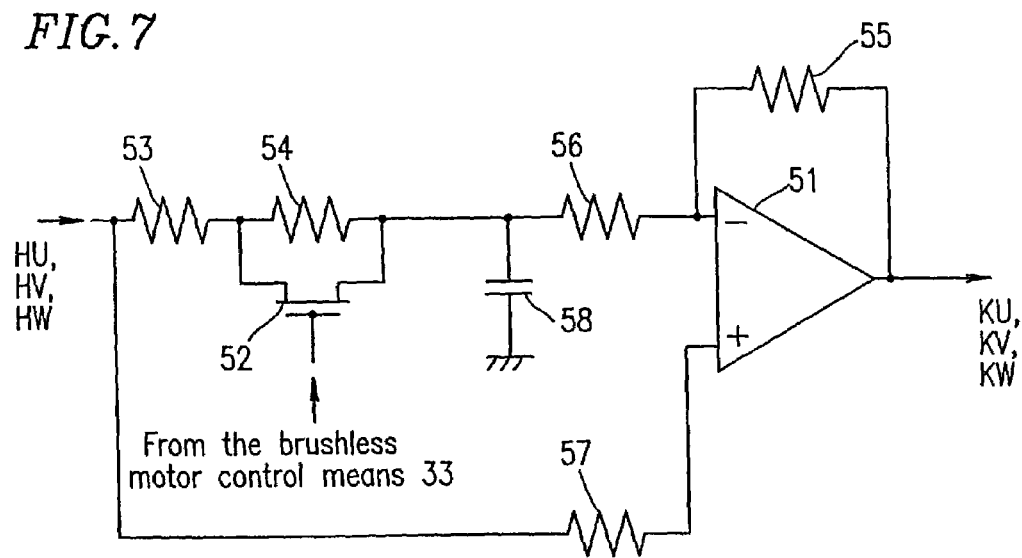
FIG. 7 shows a phase leading circuit in the third example of the present invention.

The phase lead angle circuits 24U, 24V and 24W each have an actual structure shown in FIG. 7. The phase lead angle circuit 24U, 24V, 24W shown in FIG. 7 includes an operational amplifier 51, an FET 52, a first time constant determination resistor 53, a second time constant determination resistor 54, gain determination resistors 55, 56 and 57, and a capacitor 58. The functions of the inverter 41, the amplifier 42 and the adder 43 shown in FIG. 5 are provided by a subtractor including the operational amplifiers 51 and the like.

With the structure shown in FIG. 7, substantially the same phase characteristics as provided by the lead angle correction means 23 (FIG. 2) in the second example can be provided by setting the constants as follows. The resistance value of the first time constant determination resistor 53 is set to 200 Ω; the resistance value of the second time constant determination resistor 54 is set to 800 Ω; and the resistance value of each of the gain determination resistors 55, 56 and 57 is set to 10 kΩ.

An operation of the disc apparatus 300 having the above structure will be described. When the power of the disc apparatus 200 is turned on or the optical disc 1 is loaded by a loading mechanism, the disc distinguishing means 10 distinguishes the disc type.

First, the operation of the disc apparatus 300 when the disc is a CD-ROM disc will be described. When the disc distinguishing means 10 detects that the disc is a CD-ROM disc, the brushless motor control means 33 sets the bias provided to the FET of the lead angle correction means 24 to zero, thereby switching the time constants of the phase lead angle circuits 24U, 24V and 24W to a value preferable for reproducing information from the CD-ROM disc.

When the brushless motor 5 is started to start rotating the optical disc 1, the lead angle is stable at 0 degrees as represented by characteristic 28 in FIG. 12. As the rotation rate increases, the phase gradually leads. Thus, the brushless motor 5 is driven in an optical weak field. This increases the rotation rates, which continuously accelerates the brushless motor 5.

During this period, the brushless motor control means 33 merely controls the driving voltage while monitoring the rotation rate. Namely, the brushless motor 5 can be accelerated up to 9000 rpm by exactly the same control as the usual control.

When the disc is a DVD-ROM disc, the brushless motor 5 is driven by basically the same procedure as in the case of the CD-ROM disc except that the rotation rate is different.

Next, the operation of the disc apparatus 300 when the disc is a DVD-RAM disc will be described. When the disc distinguishing means 10 detects that the disc is a DVD-RAM disc, the brushless motor control means 33 provides the FET 44 (or 52) of the lead angle correction means 24 with a sufficient bias. This switches the time constants of the phase lead angle circuits 24U, 24V and 24W to a value preferable for recording information to and reproducing information from the DVD-RAM disc. As a result, the relationship between the rotation rate and the phase lead angle as represented by characteristic 27 in FIG. 12 is obtained.

When the brushless motor 5 is started to start rotating the optical disc 1, the lead angle is stable at 0 degrees as represented by characteristic 27 in FIG. 12. As the rotation rate increases, the phase gradually leads. Thus, the brushless motor 5 is driven with the delay in the current caused by the coil inductance component being corrected. This increases the rotation rate of the brushless motor 5.

The brushless motor control means 33 drives the brushless motor 5 with ZCLV control. When the optical head 6 is above an innermost position of the DVD-RAM disc, the disc rotation rate is set to 3250 rpm. When the optical head 6 is above an outermost position of the DVD-RAM disc, the disc rotation rate is set to 1350 rpm. The disc rotation rate can always be varied within the range between 3250 rpm and 1350 rpm in accordance with the position of the optical head 6. As described above, the brushless motor 5 is designed to have optimal motor's characteristics assuming a certain rotation rate range in which the brushless motor 5 is used. The brushless motor 5 is also driven with the delay in the current caused by the coil inductance component being corrected. Therefore, the time required for changing the rotation rate of the disc, accompanied by the seek operation, can be shortened.

The rotation rate of the brushless motor 5 is frequently changed, but the control is simple for the following reason. In order to correct the delay in the current caused by the inductance component, the lead angle is automatically changed by the function of the lead angle correction means 24 as described above. Therefore, it is not necessary that the setting of the lead angle be changed by the brushless motor control means 33 in the disc apparatus 300.

In general, outputs from the hall elements 21U, 21V and 21W are significantly distorted in the waveforms and include large noise components. These waveform distortions and noise components are included as frequency components which are higher than the frequency of the fundamental waves of the outputs. Accordingly, when a phase leading circuit for raising the gain as the frequency increases is used, the waveform distortions and noise components increase and act as disturbance factors. However, the lead angle correction circuit 24 in this example includes the integration circuit. Therefore, the waveform distortions and noise components decrease, and thus the influence thereof is insignificant.

As described above, in the third example, the relationship between the magnitude of the lead angle and the rotation rate can be switched by the lead angle correction means 24 in accordance with the output from the disc distinguishing means 10. Since the brushless motor 5 can be driven by being provided with the optimal lead angle corresponding to the rotation rate of each type of disc, the highest possible performance of the brushless motor 5 can be derived. Even when different rotation control systems, such as the ZCLV rotation control system and the CAV rotation control system, are used for different types of optical discs 1, the same control can be performed as in the conventional disc apparatus. Therefore, the load on the brushless motor control means 33 is insignificant. The entire structure of the disc apparatus 300 is simple and easy to realize. Since the lead angle correction means 24 includes an integration circuit, the lead angle correction means 24 is not substantially influenced by the noise components or the waveform distortions even when they are included in the outputs from the hall elements 21U, 21V and 21W.

In this example, the signal HBU is used as a signal provided with a certain lead angle. The signal HBU has the phase led by 180 degrees as a result of inverting the position detection signal HU shown in FIG. 4. As described above, the position detection signals HU, HV and HW shown in FIG. 4 have phases offset with respect to each other by 120 degrees. Therefore, the signal HBU may be replaced with another signal which is obtained as follows. A signal having a phase led by 120 degrees with respect to a signal, the phase of which is to be led, is selected from the remaining two signals. For example, a signal having a phase led by 120 degrees with respect to the position detection signal HU is selected from the position detection signals HV and HW. The selected signal may be used instead of the signal HBU. In this case, the lead angle is 30 degrees at the maximum, but an appropriate type of brushless motor can perform sufficiently even at the lead angle of 30 degrees at the maximum.

Figure 8:
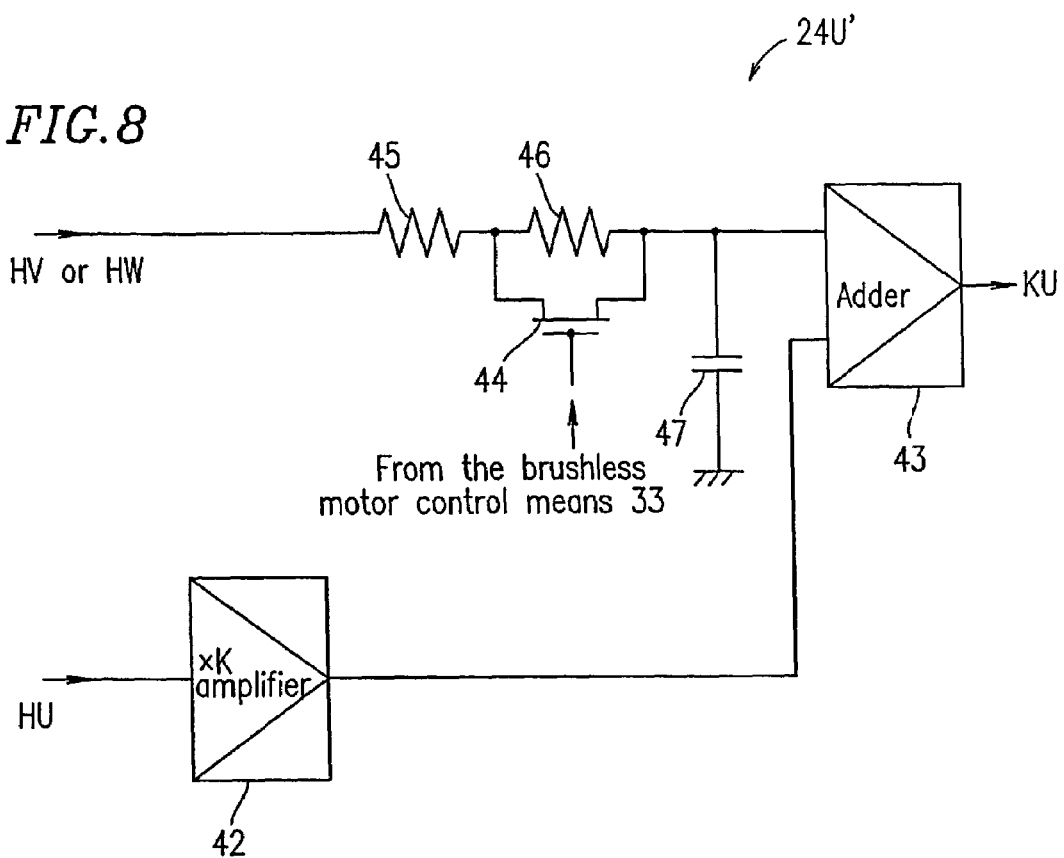
FIG. 8 shows a phase leading circuit in the third example of the present invention.
Figure 9:
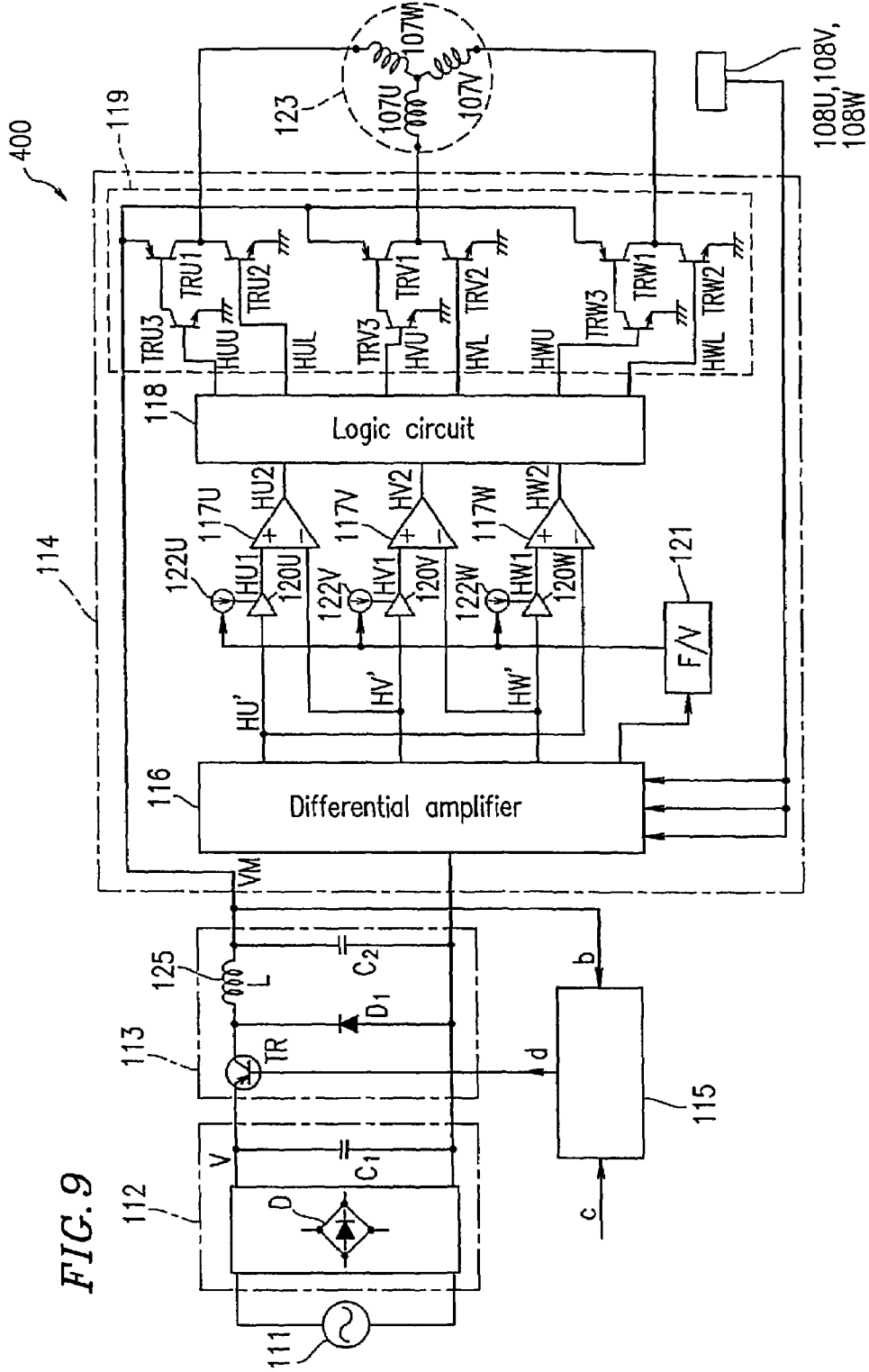
FIG. 9 shows a conventional brushless motor control device.
Figure 10:
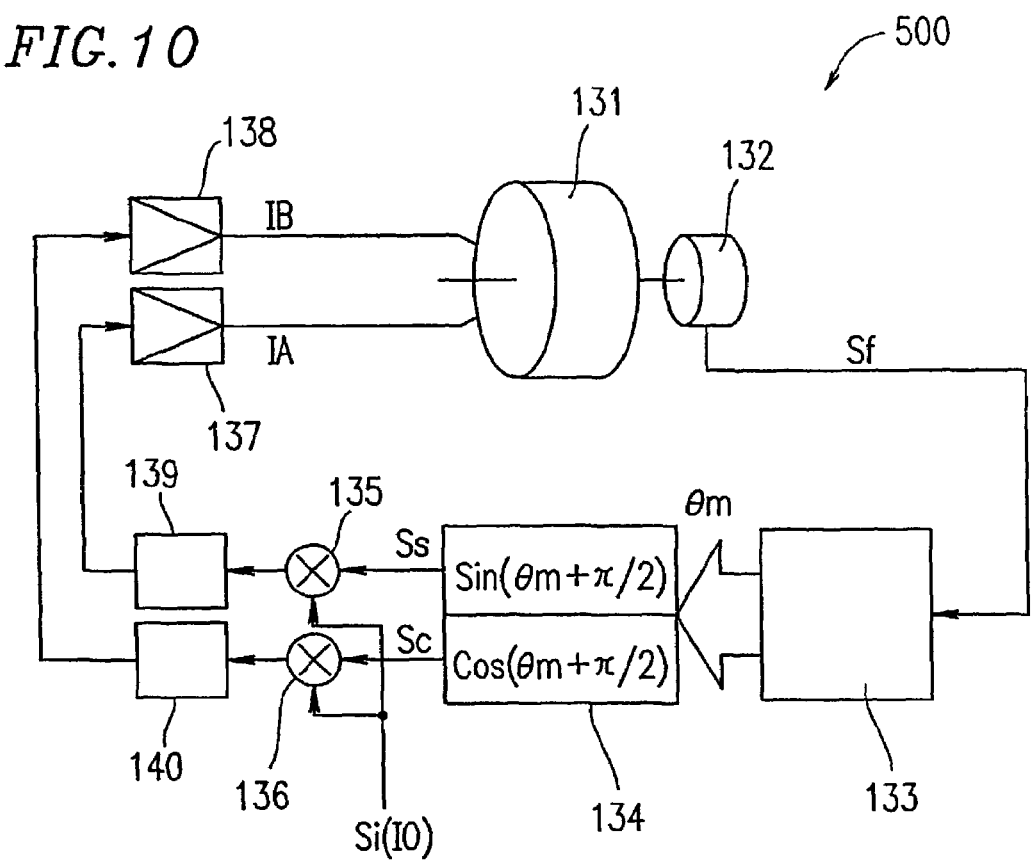
FIG. 10 shows a conventional pulse motor driving circuit.
Figure 11:
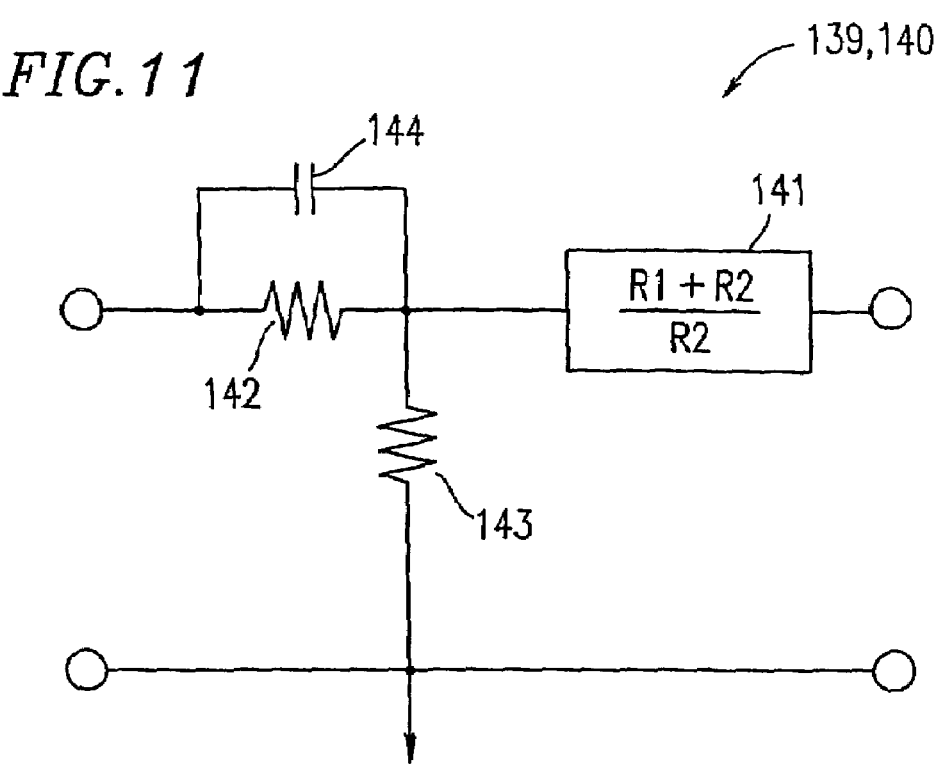
FIG. 11 shows a conventional phase leading circuit.

FIG. 8 shows a phase leading circuit 24U' using the position detection signals HV or HW instead of the signal HBU. The phase leading circuit 24U' shown in FIG. 8 has a structure obtained by deleting the inverter 41 from the structure of the phase leading circuit 24U shown in FIG. 5. In the phase leading circuit 24U', the position detection signal HU is input to the amplifier 42, and the position detection signal HV or HW having a phase deviated by a prescribed angle (for example, 120 degrees) with respect to the position detection signal HU is input to the first time constant determination resistor 45. For the position detection signals HV and HW also, phase leading circuits 24V' and 24W' corresponding to the phase leading circuit 24U' are respectively provided.

The phase leading circuits 23U, 23V, 23W, 24U, 24V, 24W and 24U' shown in FIGS. 3, 5, 7 and 8 each have two time constant determination resistors. Each phase leading circuit may include any number of time constant determination resistor(s) in accordance with various conditions. For example, when the time constant is to be changed in three stages, each phase leading circuit includes three constant determination resistors.

The circuit constant may be changed by combining the ON state and the OFF state of FETs respectively connected to the time constant determination resistors. It is not necessary that the time constant determination resistors be connected in series. The time constant determination resistors may be connected in parallel. Instead of the time constant determination resistors, variable resistors may be used. Instead of the FETs, bipolar transistors may be used.

The differentiation circuit and the integration circuit each may include a plurality of capacitors. In this case, a transistor may be connected to at least one of the capacitors in parallel. The circuit constant may be changed by switching the capacitance of the capacitor by substantially the same method as the method used with the time constant determination resistors.

INDUSTRIAL APPLICABILITY

According to a control device for a brushless motor, and a disc apparatus using the same, of the present invention, an unnecessary vibration is detected by vibration detection means, and the lead angle setting means sets the magnitude of the lead angle in accordance with the detected unnecessary vibration. Thus, despite an individual variance in vibration among brushless motors and optical discs, the lead angle can be effectively set within a tolerable range and the unnecessary vibration can be restricted to be equal to or less than a prescribed level with certainty. Therefore, the reliability of the disc apparatus can be improved.

Since the magnitude of the lead angle is set in accordance with the output from the disc distinguishing means, the brushless motor can be provided with an optimal lead angle for each of different types of discs having different levels of durability against vibration, and the highest possible performance can be derived from the disc apparatus. In addition, it can be distinguished whether the disc is of the ZCLV rotation control system or of the CAV rotation control system as well as the type of disc. Therefore, the lead angle can be set in a simple manner utilizing the features of each rotation control system.

The outputs from the rotor position detection means are synthesized by the synthesis means after the amplitudes thereof are uniformized and the high harmonic components thereof are removed by the regulation means. Therefore, even when the outputs from the rotor position detection means have a variance in amplitudes or distortion in waveforms, such factors tend not to influence the setting precision of the lead angle in each phase. Thus, a highly precise correction of the lead angle can be performed.

According to a control device for a brushless motor, and a disc apparatus using the same, of the present invention, lead angle correction means is provided for changing the circuit constant of the differentiation circuit or the integration circuit in accordance with the output from the disc distinguishing means, and for changing the relationship between the rotation rate and the lead angle of the brushless motor. The lead angle correction means provides an output from the rotor position detection means with a lead angle having a variable amount, so as to generate a translocation timing of a driving current to the stator coil. The lead angle correction means drives the brushless motor, while always providing the brushless motor with an optimal lead angle corresponding the rotation rate of each type of disc. Thus, the highest possible performance of the brushless motor can be derived.

According to a control device for a brushless motor, and a disc apparatus using the same, of the present invention, even when different rotation control systems, such as the ZCLV rotation control system and the CAV rotation control system, are used for different types of optical discs, the same rotation control can be performed with substantially the same load as that in the conventional disc apparatus. Therefore, the load on the brushless motor control means 33 is insignificant.

A control device for a brushless motor, and a disc apparatus using the same, of the present invention have very simple structures and are easy to realize.

The lead angle correction means in a control device for a brushless motor and a disc apparatus using the same of the present invention are not easily influenced by the noise components or waveform distortions even when they are included in the output from a hall element.

A control device for a brushless motor according to the present invention is not limited to be applied to a disc apparatus, but is applicable to any device including a brushless motor, the motor's characteristics of which is preferably variable.

The invention claimed is:

1. A brushless motor control device, comprising:
    a brushless motor including a rotor magnet and a stator coil;
    rotor position detection means for detecting positions of a plurality of magnetic poles of the rotor magnet;
    vibration detection means for detecting an unnecessary vibration of the brushless motor when the brushless motor is rotating and providing a first output indicative of the detected vibration;
    lead angle setting means for setting a magnitude of a lead angle via a second output such that the first output from the vibration detection means does not exceed a prescribed tolerable value; and
    lead angle correction means for providing the lead angle to a third output, wherein the third output is based on the detected positions of the magnetic poles as determined by the rotor position detection means, in accordance with the second output from the lead angle setting means, so as to generate a translocation timing of a driving current to the stator coil.

2. A disc apparatus including a brushless motor control device according to claim 1, wherein the brushless motor rotates an information disc, the disc apparatus comprising:
    a head for recording information: to the information disc or reproducing information from the information disc; and
    head control means for controlling the head to be on a track of the information disc,
    wherein the vibration detection means detects a magnitude of the unnecessary vibration from a control residual between the head and the track.

3. A disc apparatus for allowing a plurality of types of information discs of different recording formats to be exchangeably mounted thereon, the disc apparatus comprising:
    a brushless motor including a rotor magnet and a stator coil for rotating at least one information disc mounted on the disc apparatus among the plurality of types of information discs;
    rotor position detection means for detecting positions of a plurality of magnetic poles of the rotor magnet;
    distinguishing means for distinguishing a recording format of the at least one information disc and providing a first output indicative of the recording format;
    lead angle setting means for setting a magnitude of a lead angle via a second output utilizing the first output from the distinguishing means; and
    lead angle correction means for providing the lead angle to a third output, wherein the third output is based on the detected positions of the magnetic poles as determined by the rotor position detection means, in accordance with the second output from the lead angle setting means, so as to generate a translocation timing of a driving current to the stator coil.

4. A disc apparatus according to claim 3, further comprising;
    vibration detection means for detecting an unnecessary vibration of the brushless motor when the brushless motor is rotating,
    wherein the lead angle setting means sets a magnitude of a tolerable value of the unnecessary vibration in accordance with the first output and sets the magnitude of the lead angle such that a fourth output from the vibration detection means does not exceed the tolerable value.

5. A disc apparatus according to claim 3, wherein:
    at least a first information disc and a second information disc having a lower recording density than that of the first information disc among the plurality of types of information discs are exchangeably mounted, and
    when the distinguishing means detects the presence of the first information disc, the lead angle setting means sets the lead angle to be smaller than when the distinguishing means detects the presence of the second information disc.

6. A disc apparatus according to claim 3, wherein the at least one information disc is driven with ZCLV control, and the lead angle is set to substantially 0 degrees.

7. A disc apparatus according to claim 3, wherein the at least one information disc is driven with CAV control.

8. A disc apparatus according to claim 3, wherein:
    at least a recording and reproduction information disc usable for recording and reproduction and a reproduction-only information disc usable only for reproduction among the plurality or types of information discs are exchangeably mounted, and
    when the distinguishing means detects the presence of the recording and reproduction information disc, the lead angle setting means sets the lead angle to be smaller than when the distinguishing means detects the presence of the reproduction-only information disc.

9. A brushless motor control device, comprising:
    a brushless motor including a rotor magnet and a stator coil;
    rotor position detection means for detecting positions of a plurality of magnetic poles of the rotor magnet; and
    lead angle correction means for providing a lead angle having a variable amount to an output from the rotor position detection means, so as to generate a translocation timing of a driving current to the stator coil, wherein:
    the rotor position detection means generates a plurality of detection signals having different phases from each other, and
    the lead angle correction means includes regulation means for converting the plurality of detection signals into a plurality of generally sine-waved signals having a prescribed amplitude, and synthesis means for synthesizing the plurality of generally sine-waved signals at a prescribed ratio.

10. A brushless motor control device according to claim 9, wherein the regulation means includes a low pass filter for allowing a signal in a frequency range corresponding to the rotation frequency of the brushless motor, among the plurality of detection signals, to pass therethrough.

11. A, brushless motor control device according to claim 9, wherein the regulation means includes an AGC circuit.

12. A disc apparatus including a brushless motor control device according to claim 9, wherein the brushless motor rotates an information disc, the disc apparatus comprising:
    a head for recording information to the information disc or reproducing information from the information disc; and
    head control means for controlling the head to be on a track of the information disc.

* * * * *